United States Patent [19]

Becking

[11] Patent Number: 4,609,422
[45] Date of Patent: Sep. 2, 1986

[54] PRINTER RIBBON CARTRIDGE LOADING SYSTEM

[76] Inventor: Paul E. Becking, 13,195 Paseo Barranco, Salinas, Calif. 93908

[21] Appl. No.: 576,855

[22] Filed: Feb. 3, 1984

[51] Int. Cl.[4] .............................................. B31F 5/00
[52] U.S. Cl. .................................... 156/502; 156/73.4; 156/159; 156/510; 156/580.1; 242/197; 269/91; 269/111; 269/265
[58] Field of Search ............................... 269/37, 41–42, 269/152, 87.2, 87.1, 40, 89, 91–92, 109, 111, 153, 265; 403/270; 156/73.5, 73.4, 157, 159, 251, 270, 353, 380.4, 582, 510, 515, 526, 535, 580.1, 580.2, 581, 250, 502; 242/75.52, 197; 264/138, 145, 192, 163

[56] References Cited

U.S. PATENT DOCUMENTS

| | | | |
|---|---|---|---|
| 2,636,952 | 4/1953 | Fahringer | 200/52 |
| 2,931,482 | 4/1960 | Bishop | 197/175 |
| 3,354,769 | 11/1967 | Abramson et al. | 269/87.2 |
| 3,477,657 | 11/1969 | Norbisrath | 242/56 |
| 3,507,459 | 4/1970 | Campbell, Jr. | 242/75.51 |
| 3,753,834 | 8/1973 | King | 156/506 |
| 3,821,048 | 6/1974 | Acker et al. | 156/73.4 |
| 3,825,461 | 7/1974 | Gorman | 156/506 |
| 3,854,643 | 12/1974 | Weaver | 226/35 |
| 3,924,177 | 12/1975 | Lemineur et al. | 324/61 R |
| 3,941,332 | 3/1976 | Matula | 242/75.52 |
| 4,050,617 | 9/1977 | Biggs et al. | 226/1 |
| 4,116,398 | 9/1978 | Roberts | 242/56 R |
| 4,181,270 | 1/1980 | Laar et al. | 242/66 |
| 4,316,589 | 2/1982 | Stranders | 242/197 |
| 4,415,285 | 11/1983 | Bury | 400/196.1 |

Primary Examiner—Edward Kimlin
Assistant Examiner—Merrell C. Cashion
Attorney, Agent, or Firm—David S. Wise

[57] ABSTRACT

There is disclosed herein an improved apparatus and method for stuffing pre-inked printer ribbon from a ribbon roll into a ribbon cartridge. The apparatus includes a drive motor for pulling the ribbon into the cartridge and a supply motor connected to a spool for automatically feeding ribbon to the cartridge. Between the drive and supply motors, the ribbon passes through a splice detection means, around a length measuring means, and through a cutter mechanism. The length measuring means includes a brake for stopping motion of the ribbon. The cartridge loading apparatus further includes a built-in ribbon welder mechanism for adjoining the end of the pre-inked ribbon to a leader ribbon assembled into the cartridge and a cartridge support means adaptable to any cartridge configuration.

8 Claims, 18 Drawing Figures

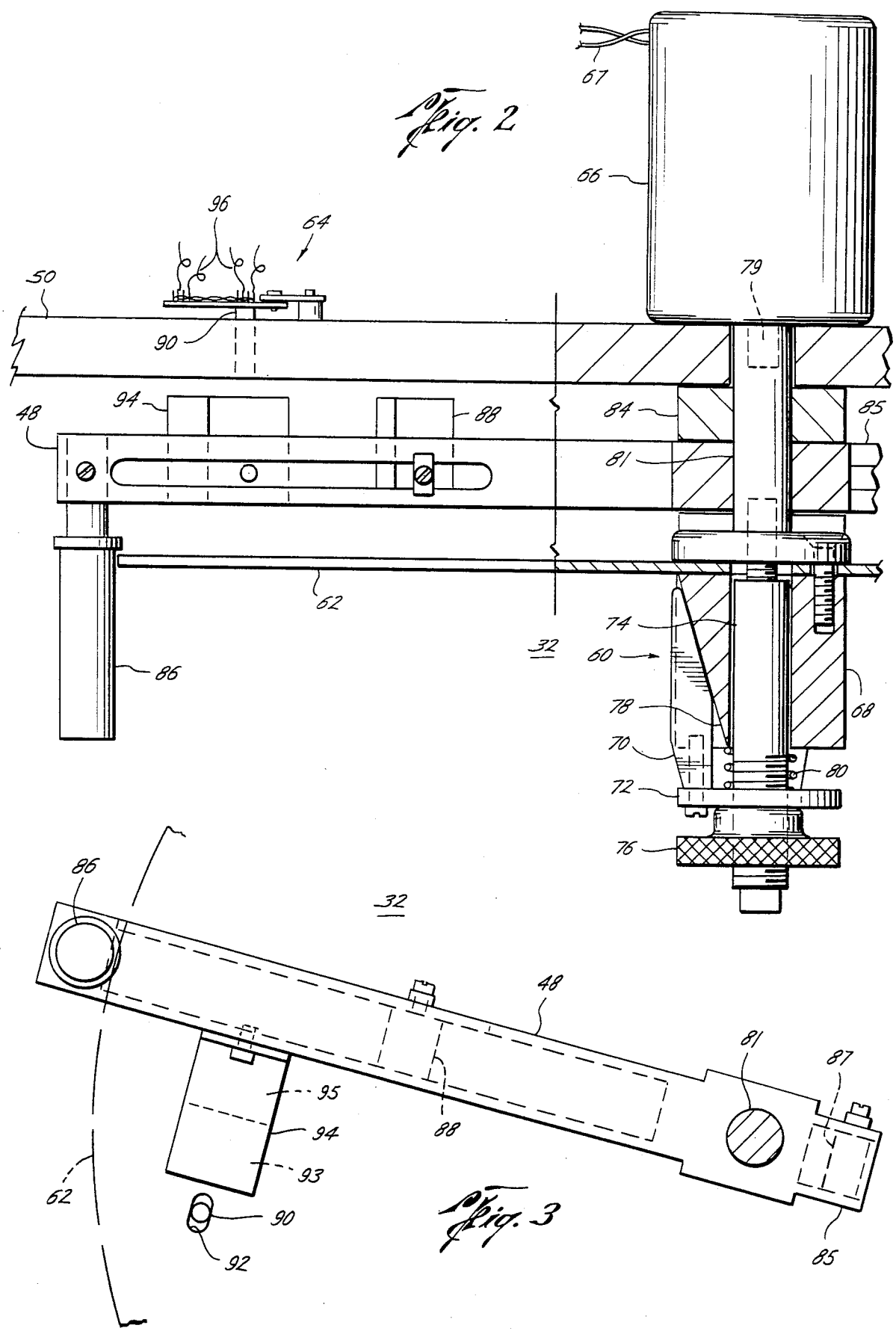

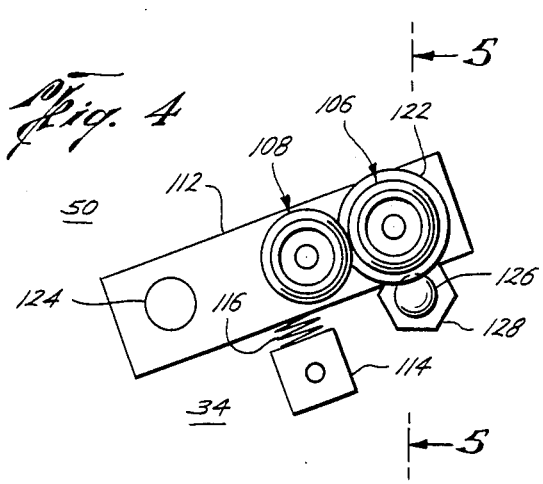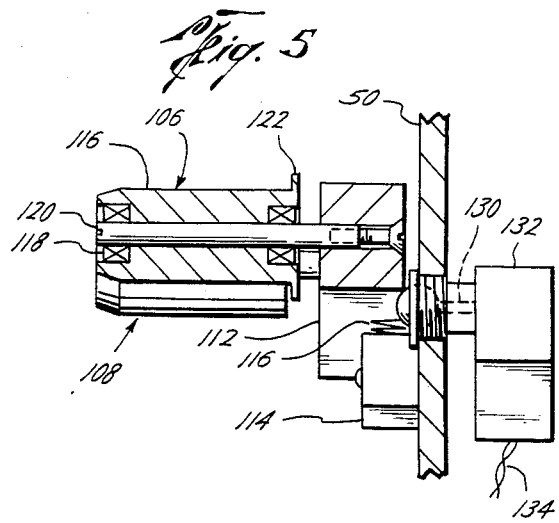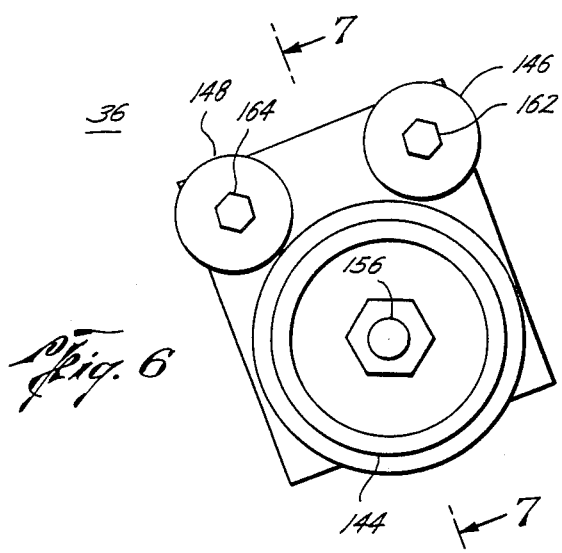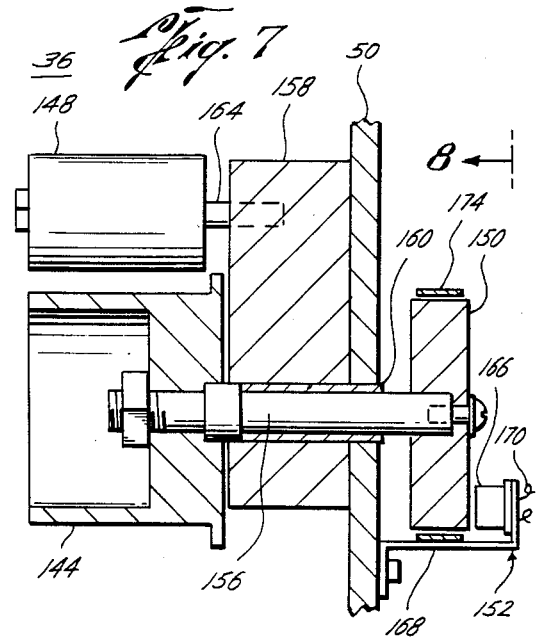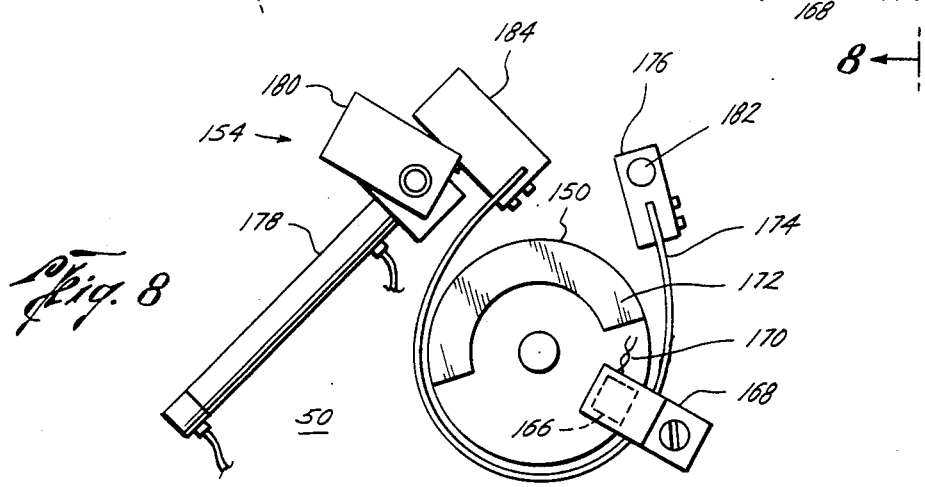

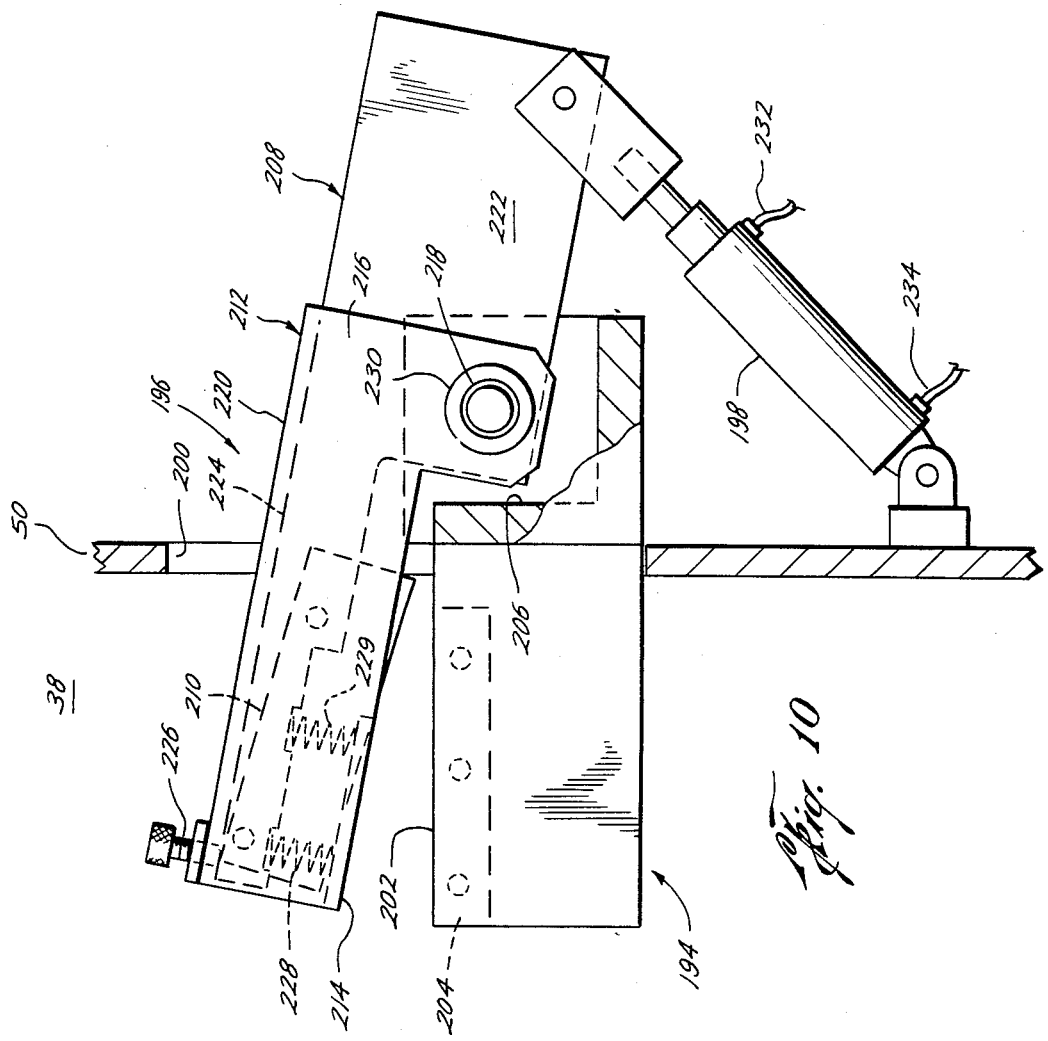
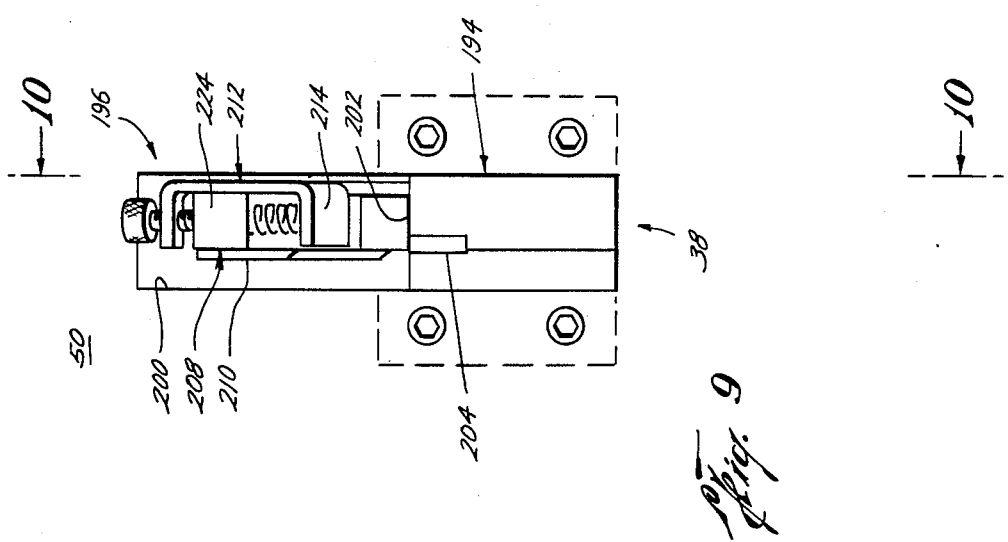

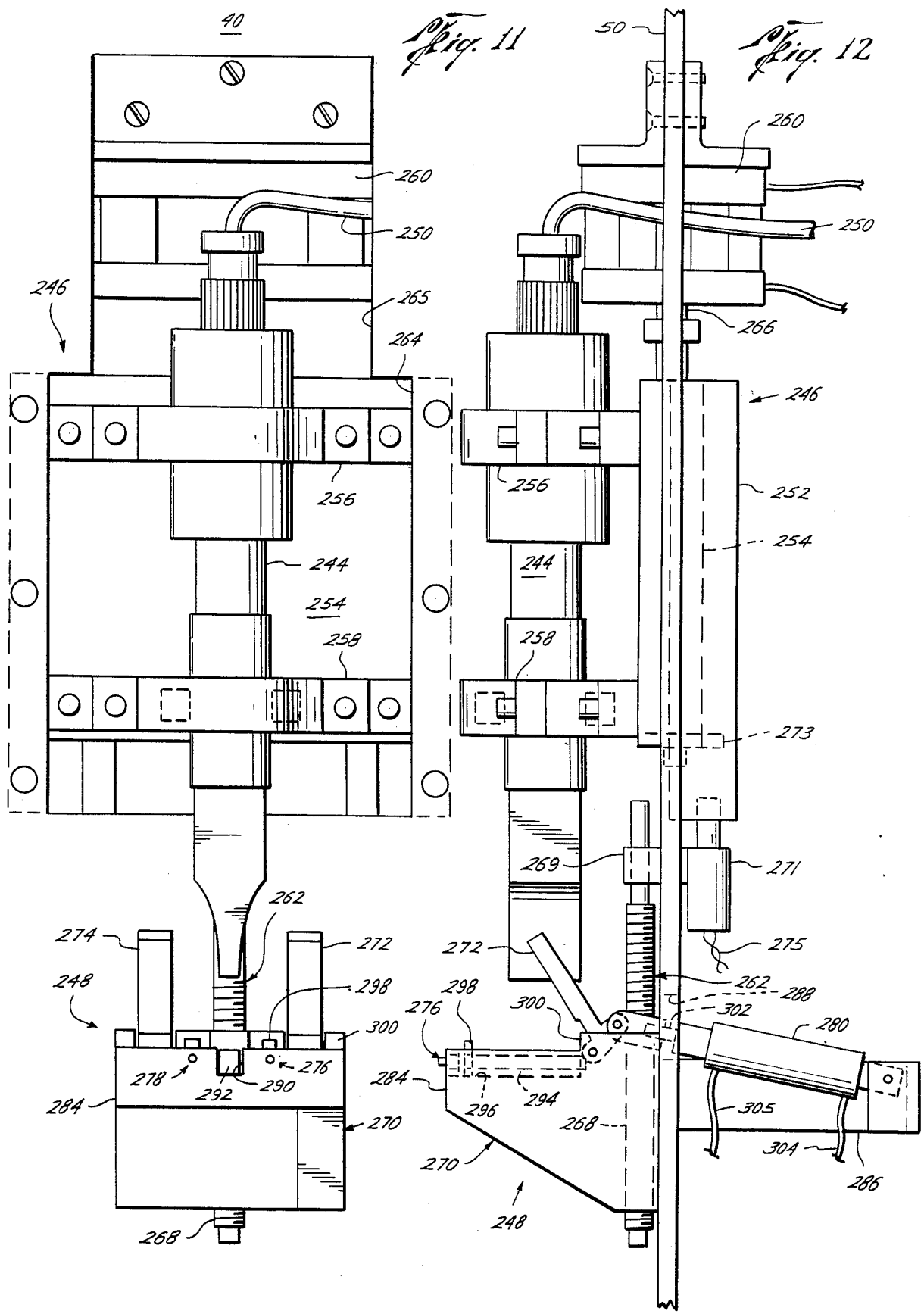

PRINTER RIBBON CARTRIDGE LOADING SYSTEM

BACKGROUND OF THE INVENTION

The present invention relates generally to cartridges containing a continuous loop of ribbon, especially fabric ribbon, for use in printers associated with equipment such as computers and word processors. More particularly, the present invention relates to a method and apparatus for loading an assembled cartridge with a predetermined length of ribbon from a ribbon spool. Still more particularly, the present invention provides an improved method and apparatus for loading ribbon into a preassembled printer cartridge whereby the speed and reliability of the loading process is greatly enhanced.

Present society is highly dependent on the use of microprocessors, minicomputers, and mainframe computers. In addition to the more traditional use of computers as a research tool, computers are now often found in the home environment and work environment of individuals who, until recently, never before came into contact with a computer. Computers are used to automate equipment in a manufacturing facility, to automate secretarial duties at the office (word processors), and to automate a myriad of toys and tools around the home.

All computers, whether mainframe computers, minicomputers, or microcomputers, share a common requirement for some means of communication with users. Such means of communication may vary from a simple light-emitting diode (LED) to the complex cathode ray tube (CRT) terminal. A common means for communication of information from a computer to a user is a printer. Printers typically receive from a computer a stream of information in the form of digital electronic signals and convert the electronic signals to a series of symbols (letters and words) printed on paper.

A first common type of printer is an impact printer, so named for the means by which characters are printed on paper. Each symbol which the impact printer is capable of generating is permanently embossed on a striking surface (analogous to the ball within a typewriter) within the printer. The printing of a particular character is accomplished by aligning the embossed image of that character with the paper surface onto which the character is to be printed, positioning a printer ribbon having ink thereon between the striker and the paper, and causing the striker to impact the ribbon against the paper surface so as to result in an ink image of the embossed character on the surface of the paper. Printer ribbons typically are made of fabric, such as nylon, or polyester film coated with a carbon-type surface.

A second common type of printer is a dot matrix printer. Such a printer includes a group of small-diameter wires oriented parallel to one another and arranged in a two-dimensional matrix. Each wire is arranged for independent extension from its normal matrix position to contact a printer ribbon, thereby printing a dot image on an adjacent paper surface. By selectively extending particular patterns of wires, dot images can be combined to form alphanumeric or other legible characters on the paper surface.

In approximately 1970 there first appeared on the market a printer ribbon having the ends thereof adjoined to form a continuous loop. The continuous loop ribbons are housed within cartridges which easily may be removed from and inserted within the printers. Such continuous loop cartridges mechanically simplify the ribbon control portion of printers and thereby eliminate a potential source of printer failure.

A number of companies throughout the world today are engaged in the business of manufacturing and/or loading printer ribbon cartridges. Typically, ribbon is manufactured, inked, and spooled into large, narrow rolls. For some time, ribbon cartridges have been manufactured and delivered unassembled to the point of cartridge loading, so that the inked ribbon from the ribbon spool could be threaded through the operative parts of the cartridge before assembly thereof.

U.S. Pat. No. 4,050,617 (Biggs et al.) depicts an apparatus for loading ribbon into unassembled cartridges. The apparatus of Biggs threads the end of the inked ribbon between a cartridge capstan and a cartridge drive gear and through the cartridge before clamping the lid onto the cartridge base. Thereafter, the apparatus rotates the drive gear within the cartridge to draw ribbon into the cartridge. As ribbon is pulled into the cartridge, rotation of the drive gear is monitored to measure the length of the ribbon being loaded into the cartridge. A microswitch pressing the ribbon against a roller detects splices in the ribbon when the thickness of the ribbon exceeds 0.005 inch. Finally, a cutoff blade severs the ribbon when the cartridge is loaded and grasps the end of the ribbon from ribbon roll for threading through the next cartridge.

The apparatus of Biggs would appear to function reasonably well for loading the particular type of cartridge for which it was designed. The use of a cammed front plate and a cam follower apparatus for threading the ribbon through the cartridge, however, restricts the application of Biggs' apparatus to the single cartridge for which it was designed. Thus, each of the more than sixty different cartridge configurations could require the design and construction of a separate loading apparatus—obviously a very expensive proposition for one in the business of manufacturing and loading printer ribbon cartridges.

Part of the problem is resolved by eliminating from the cartridge loading apparatus portions thereof used exclusively for threading operations. Recently, many manufacturers have begun the practice of assembling the cartridge at the point of manufacture and including on assembly a short "leader" ribbon extending through the cartridge. Thereafter, at the point of cartridge loading, the inked ribbon is taped to the leader ribbon by an operator and pulled through the cartridge. See U.S. Pat. No. 4,415,285. A cartridge loading apparatus then is used to stuff the cartridge with the inked ribbon.

In a process known generally as "restuffing," a ribbon cartridge is recycled by removing the spent printer ribbon and restuffing the cartridge with newly inked ribbon. A leader ribbon may be formed in a used cartridge by leaving a short length of the old ribbon running through the cartridge.

Applicant is aware of several companies engaged in the manufacture of apparatus for loading printer ribbon into cartridges, including Computer Ribbon Machinery GmbH of Berlin, West Germany, and MSS Supply Corporation of Halesite, N.Y. Although Applicant is not aware of the particular details of the cartridge loading apparatus manufactured by such companies, it appears that such apparatus, like the apparatus of Biggs, will function adequately to load the ribbon into cartridge, but includes certain structural inefficiencies which have an impact on the overall cost of the cartridge loading process. For example, the adaptability of any one cartridge loading apparatus to various cartridge configurations depends on the purchase of various fixtures. Typically, such fixtures are sold separate from the apparatus itself. In at least one case, a complete set of fixtures for the apparatus is more expensive than the apparatus itself.

Another example of inefficiency lies in the cost of labor required to operate the apparatus. Quite obviously, time is money. Yet, the myriad of cartridge configurations seems to have stymied the development of an efficient loading apparatus. Manufacturers seem to have gotten little beyond the use of a motor to pull ribbon into the cartridge. The inherent limitations on the cartridge loading process understandably have had their toll. Cartridge loading speed is limited by the cartridge and by the ribbon. Cartridges are assembled from molded plastic parts which are manufactured as inexpensively as possible. Consequently, there is a definite limit to the amount of stress which the cartridge, particularly the drive gear and drive capstan, can withstand without suffering damage. In addition, care must be exercised to limit stress on the inked ribbon as it is pulled by the cartridge drive gear off of the ribbon roll and through the cartridge. Certain manual operations, such as placing the cartridge onto the apparatus or taping the inked ribbon to the leader ribbon, or, in some cases, cutting the ribbon after loading expend significant amounts of operator time. Changing rollers and other parts of the prior art apparatus in order to accommodate different ribbon widths consumes inordinate amounts of time.

Hence, although there presently exists apparatus for loading printer ribbon into cartridges, it should be apparent that such apparatus may be improved in structure and operation to enhance its speed and reliability and therefore to improve the cost effectiveness of the cartridge loading process.

SUMMARY OF THE INVENTION

Accordingly, there is provided herein a method and apparatus for loading printer ribbon into a printer cartridge. The apparatus of the present invention is structured to improve the overall efficiency of the cartridge loading process by enhancing the actual loading speed of the apparatus, by simplifying and minimizing operator interaction with the apparatus, and by improving the reliability of certain features of the apparatus. The cartridge loading apparatus of the present invention comprises a plate means, a cartridge support means for affixing the cartridge to the plate means, a ribbon supply means providing a continuous supply of pre-inked ribbon to the cartridge, and a drive means for drawing ribbon into the cartridge. The apparatus further comprises a ribbon welding means connected to the plate means for adjoining an end of the pre-inked ribbon extending from the ribbon supply means to an end of a leader ribbon extending through a preassembled cartridge.

The ribbon welding means includes a welding anvil having a pair of manually actuated clamps and an adjustable ribbon guide mechanism. The operator grasps each ribbon end, one at a time, threads it through the apparatus to the welding anvil, positions the ribbon end across the welding anvil, and, while holding it there with one hand, depresses a conveniently positioned actuator button, which causes a pneumatically actuated clamp to lock the ribbon end against the anvil. In this manner, the ribbon ends are clamped in overlapping configuration beneath a converter booster horn stack of an ultrasonic welder.

Thereafter, when the apparatus is energized, the welder stack is automatically lowered into proximity of the overlapped ribbon ends, the welder stack is energized to fuse the overlapped ribbon ends, the welder stack is retracted away from the welding anvil, and the anvil clamps are raised to release the ribbon. Hence, the present apparatus obviates the clumsy necessity of taping two ribbon ends so that the pre-inked ribbon may be pulled through the cartridge. In addition, the reliability of the cartridge loading process is improved by use of the method of fusing the two ribbon ends as opposed to the less secure method of taping the ribbon ends together.

In the case of cartridges having an externally exposed drive gear, it is not necessary to preassemble the cartridge with a leader ribbon therethrough. The end of the pre-inked ribbon may be threaded past the ribbon welding means and directly into the cartridge. Still other manufacturers may wish to assemble the cartridge on the cartridge loading apparatus with the pre-inked ribbon extending therethrough, also foregoing use of the ribbon welding means.

The cartridge support means of the present invention is adaptable, whereby the cartridge loading apparatus may be used to load ribbon into a cartridge of any known configuration without the addition of separate fixtures. The support means comprises a platen plate, means for adapting the platen plate to accommodate the plurality of cartridge configurations, and a platen arm for retaining the cartridge against the platen plate. The platen plate includes a central slot through which the drive means extends, so as to engage a drive gear within the cartridge. The drive means is slidable within the slot of the platen plate whereby the drive means may be positioned, as necessary to accommodate the cartridge configuration, at any position along the slot.

The adapting means includes a pair of setup cams, a setup slide, and a setup roller which are affixed to the platen plate at any of a plurality of positions by means of bolts threadedly received within any of a plurality of threaded boreholes arranged in a rectangular grid on the platen plate. The platen arm further includes a pivotable joint at approximately the center thereof, whereby it may be adjusted to reach the cartridge approximately at any point along the central slot in the platen plate. By reference to a setup chart, an operator may quickly and easily arrange the setup cams, the setup slide, the setup roller, and the platen arm so as to accommodate the particular configuration of the cartridge to be loaded.

Once a cartridge has been placed onto the platen plate, the operator actuates a switch on the platen arm, which energizes a pneumatic cylinder, causing the platen arm to lock the cartridge against the platen plate. Thus, the cartridge support means of the present apparatus enhances the efficiency of the apparatus by eliminating the need for a plurality of different hardware fixtures, each of which constitutes an increase in capital expense to the company engaged in the cartridge loading process.

The cartridge loading apparatus may further comprise means for cooling the drive gear of the cartridge during operation of the drive means. The cooling means may comprise a continuous flow of pressurized fluid delivered through a vortex tube, so as to decrease the temperature of the fluid, to a nozzle directing the fluid into the ribbon cartridge at the point where the drive means engages the drive gear of the cartridge. The cooling means may further comprise a continuous flow of pressurized fluid delivered to the side of the cartridge opposing the side in which the drive means engages the drive gear of the cartridge, for example, along the axis of a cartridge capstan against which the cartridge drive gear draws ribbon into the cartridge. The use of such a cooling means dissipates heat generated by friction of the plastic parts on rotation thereof by the drive means, enabling the drive means to operate at higher speeds.

The ribbon supply means may include a supply motor for delivering ribbon from a ribbon roll supported by the ribbon supply means. The ribbon supply motor is energized in response to activation of the drive means. The drive means signals a demand for ribbon from the ribbon supply means by activating an optical switch. For example, a tensioner arm receives a loop of the ribbon extending between the ribbon supply means and the cartridge. When tension increases between the ribbon supply means and the cartridge, the tensioner arm is pivoted in response to such tension, actuating the optical switch, which causes activation of the supply motor. The use of dual motors, one at the drive means and one at the ribbon supply means, enables rapid acceleration of the drive motor without risk of damage to the ribbon.

The cartridge loading apparatus may also include a ribbon length measuring means, comprising a cylinder of known diameter around which the ribbon extends. A pair of adjacent rollers ensures substantial ribbon contact with the perimeter of the cylinder, whereby motion of the ribbon between the ribbon supply means and the cartridge causes rotation of the cylinder. Means is included for detecting rotation of the cylinder and for providing an output signal indicative thereof, whereby the ribbon loading process may be stopped when a predetermined length of ribbon has been loaded into the cartridge.

The cartridge loading apparatus may further include a ribbon cutting means for clamping and severing the ribbon when the loading process is completed. For example, on indication by the ribbon length measuring means that the predetermined length of ribbon has been loaded into the cartridge, the cutting means may be actuated to halt ribbon motion and to sever the ribbon.

The apparatus may also include a brake means on the ribbon length measuring means for stopping rotation of the measuring means cylinder and motion of the ribbon on determination that the proper length of ribbon has been loaded into the cartridge. Such brake means may be activated simultaneous with the ribbon cutting means to effect an efficient loading process by bringing to a quick halt a loading process conducted at high loading speeds. Thus, no time is lost waiting for the apparatus to stop and no excessive ribbon is loaded into the cartridge.

Finally, apparatus may include a ribbon splice detection means. Such means may comprise a pair of pinch rollers disposed on the end of a pivotable detection bar. The ribbon is received between the pinch rollers, whereby a splice may be entrapped between the rollers, causing the detection bar to pivot downward and trigger a switch, which immediately stops the cartridge loading process.

Thus, the present invention comprises a combination of features, including the welding means, the cooling means, the adaptable cartridge support means, the use of dual motors, the brake means, and other features, which enable the present invention to improve substantially the overall efficiency of the cartridge loading process. In addition, certain features such as the welding means, the cutting means, and the brake means enhance the reliability of the loading process. These and various other characteristics and advantages of the present invention will become readily apparent to those skilled in the art upon reading the following detailed description and claims and by referring to the accompanying drawings.

BRIEF DESCRIPTION OF THE DRAWINGS

For a more detailed description of the preferred embodiment of the invention, reference will now be made to the accompanying drawings, wherein:

FIG. 2 shows a top elevation, partial cross section of a ribbon supply means forming a portion of the apparatus depicted in FIG. 1;

FIG. 3 shows a front elevation of the ribbon supply means shown in FIG. 2;

FIG. 4 depicts a front elevation of a splice detection means forming a part of the apparatus shown in FIG. 1;

FIG. 5 is a cross-sectional view of the splice detection means taken along a line 5—5 in FIG. 4;

FIG. 6 depicts a front elevation of a ribbon length measuring means which comprises one part of the apparatus depicted in FIG. 1;

FIG. 7 is a cross-sectional view of the ribbon measuring means taken along a line 7—7 in FIG. 6; a brake means forming a part of the measuring means is not shown in FIG. 7 for the purpose of depicting fully certain other portions of the measuring means;

FIG. 8 is a rear elevation of the measuring means, depicting in full the brake means and other portions of the measuring means;

FIG. 9 shows a front elevation of a ribbon cutting means which forms a part of the apparatus shown in FIG. 1;

FIG. 10 is a cross-sectional view of the ribbon cutting means taken along a line 10—10 in FIG. 9;

FIGS. 11 and 12 depict front and side elevations, respectively, of a ribbon welding means forming a part of the apparatus shown in FIG. 1;

DESCRIPTION OF THE PREFERRED EMBODIMENT

Figure 1:
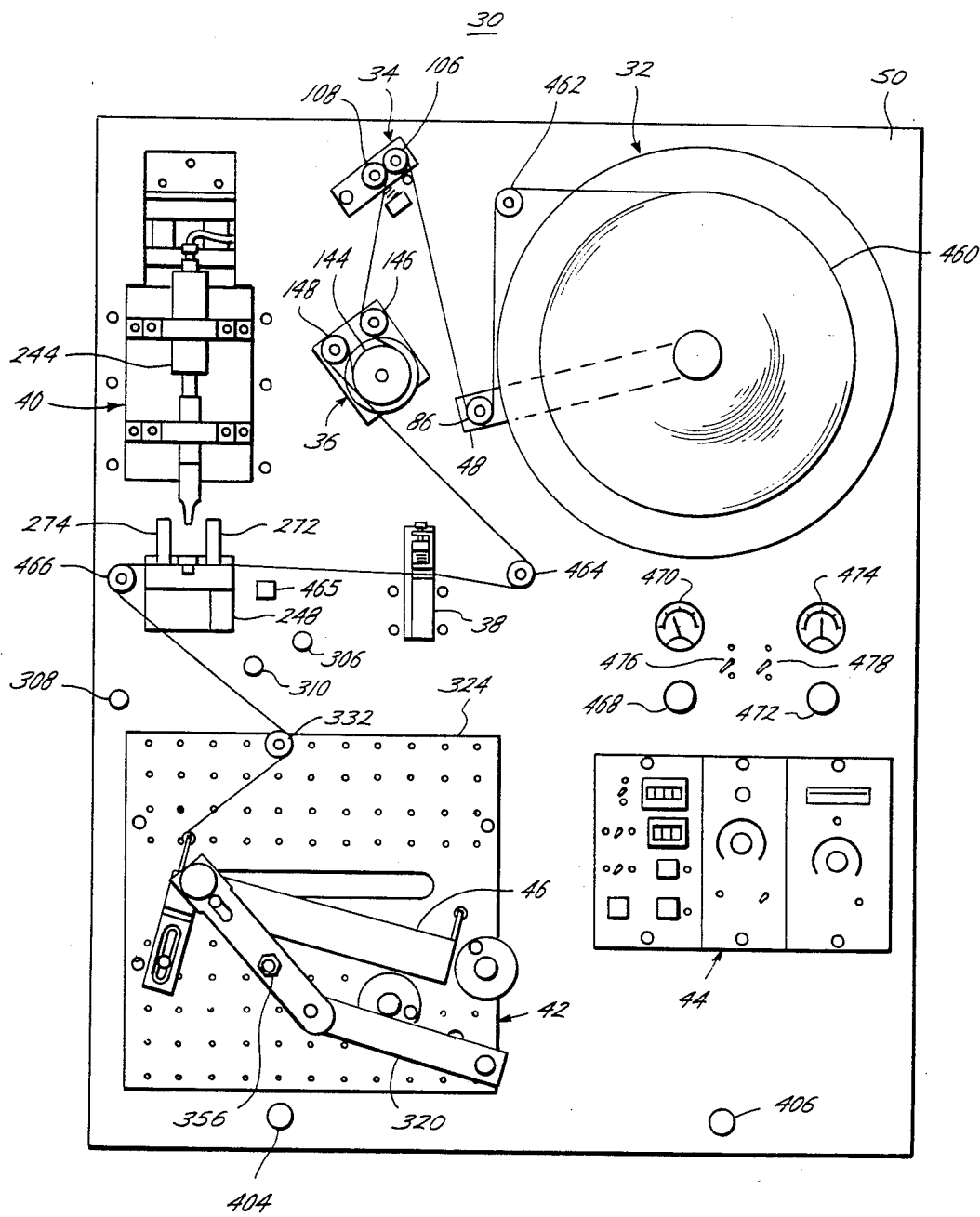
FIG. 1 depicts a front elevation of an apparatus constructed according to the principles of the present invention.

Referring now to FIG. 1, the present invention, a printer ribbon cartridge loading apparatus 30, is depicted in perspective view. More particularly, the cartridge loading apparatus 30 comprises a front plate 50, supporting a ribbon supply means 32, a ribbon splice detection means 34, a ribbon length measuring means 36, a ribbon cutting means 38, a ribbon welding means 40, a cartridge support means 42, and an apparatus control panel 44. An end of inked ribbon from the ribbon supply means 32 is threaded through the splice detection means 34, around the measuring means 36, and through the cutting means 38 to the welding means 40, where it is clamped. An end of a length of a leader ribbon extending through a cartridge 46 on the cartridge support means 42 is also threaded to the welder 40 and clamped thereto so as to overlap the end of the inked ribbon.

When the apparatus 30 thereafter is started, the overlapping ends of the ribbon are welded together and the process of stuffing ribbon into the cartridge 46 begins. A drive motor (not shown) adjoining the cartridge support means 42 rotates a drive gear within the cartridge 46 so as to draw ribbon into the cartridge 46. The speed of the drive motor is ramped up to a predetermined loading speed, avoiding the stress and fraction attendant to a jolting, step-function start. As ribbon is drawn into the cartridge 46, a tensioner arm 48, forming a part of the ribbon supply means 32, is pivoted upward by the increasing tension in the ribbon. Upward motion of the tensioner arm 48 activates a supply motor (not shown) forming a part of the ribbon supply means. The supply motor delivers additional inked ribbon to the apparatus 30 and thereby permits the tensioner arm to pivot downward, deactivating the supply motor. Thus, ribbon is delivered from the ribbon supply means 32 in response to operation of the drive motor.

The drive motor operates at a speed preselected on the apparatus control panel 44. As ribbon is loaded into the cartridge 46 at the preselected speed, cooling means (not shown) directs pressurized fluid into the cartridge 46 to cool the moving parts of the cartridge. The ribbon splice detection means 34 monitors the ribbon delivered from the ribbon supply means 32 for a splice. In the event that a splice is detected, the splice is trapped at the detection means 34 and the apparatus 30 is immediately stopped, whereupon the operator may cut out the splice and begin the cartridge loading process again, so as to insure the absence of a ribbon splice within the length of inked ribbon loaded into the cartridge 46.

In addition, throughout the loading process, the ribbon length measuring means 36 monitors the amount of ribbon loaded into the cartridge. As the amount of ribbon loaded into the cartridge approaches a length preselected on the control panel 44, the apparatus 30 slows the loading speed gradually and halts the loading process when precisely the preselected length of ribbon has been loaded into the cartridge 46. At the instant wherein the measuring means 36 indicates that the preselected length of ribbon has been loaded, a brake is applied to the ribbon at the measuring means 36 and simultaneously the ribbon is clamped and severed at the ribbon cutting means 38.

Accordingly, it should be apparent that the present apparatus 30 provides certain structural and operational improvements not present in the prior art. As will become apparent on a more detailed discussion of the apparatus 30, these improvements enhance the cost effectiveness and reliability of the overall cartridge loading process. A brief discussion of the general structure and operation of the apparatus 30 having been presented, a detailed discussion of how to make and use the apparatus 30 will be presented in the following eight subsections.

RIBBON SUPPLY MEANS

Referring now to FIG. 2, the ribbon supply means 32 is depicted in top elevation with the cover of the apparatus 30 removed so as to reveal portions of the supply means 32 located behind the front plate 50. The ribbon supply means 32 includes a spool 60, a disk 62, the tensioner arm 48, an arm position sensing apparatus 64, and a ribbon supply motor 66.

Ribbon is provided to the ribbon supply means 32 in large, narrow rolls (not shown) typically comprising a cardboard ring onto which inked ribbon has been spooled to an outer diameter, for example, of twelve inches. The ribbon roll is placed onto the spool 60 against the disk 62, which has an outer diameter, for example, of thirteen inches.

The spool 60 comprises a spool body 68, three wings 70, a wing ring 72, a central shaft 74, and a nut 76. The spool body 68 is received concentrically about the central shaft 74 and is secured thereto against the disk 62. The forwardmost end of the shaft 74 is threaded and extends forwardly of the spool body 68. The spool body includes three axially-extending channels 78, spaced at approximately 120° about the circumference of the spool body 68, having tapered depths which increase with increasing axial distance from the disk 62. The nut 76 is threaded onto the forward end of the shaft 74 with the wing ring 72 also positioned about the shaft 74 between the spool body 68 and the nut 76.

The wing ring 72 is biased against the nut 76 by means of a spring 80 extending between the spool body 68 and the wing ring 72. The wings 70 include tapered surfaces along their radially inward edges conforming generally to the tapered depths of the axial channels 78 in the spool body 68. The forward ends of the wings 70 are secured to the wing ring 72, whereby the wings 70 are maintained generally in position, with the rearward ends of the wings 70 received within the axial channels 78. When the nut 76 is manually rotated in a clockwise direction, the wings 70 are moved rearwardly in the axial channels 78, causing the wings 70 to extend radially outwardly beyond the outer diameter of the spool body 68. Thus, a roll of ribbon may be locked onto the spool 60.

The ribbon supply motor 66, which may be a Model No. DM60 24 V DC Gear Head 6H5, manufactured by Japan Servo Company, Ltd., is secured to the rearward face of the front plate 50, with a motor shaft 79 thereof extending through the front plate 50. Electric wires 67 connect the supply motor 66 to apparatus control circuitry, as described infra in the subsection entitled "Apparatus Control System." The disk 62 is coupled to the spool body 68 and the central shaft 74, with the foregoing elements being coupled to the motor shaft 79 of the ribbon supply motor 66 by means of a shaft extension 81. Thus, the spool 60 and the disk 62 rotate in response to actuation of the ribbon supply motor 66.

FIG. 3 depicts a front elevation of the ribbon supply means 32 with the disk 62 and spool 60 removed so as to expose the structural details of the tensioner arm 48. Referring now to FIGS. 2 and 3, the tensioner arm 48 is rotatably supported on the shaft extension 81, spaced from the front plate 50 by a spacer ring 84, which is attached to the front plate 50 so as to receive the shaft extension 81 concentrically therethrough. The spacer ring 84 includes means (not shown) for limiting the pivotal stroke of the tensioner arm 48. The free end of the tensioner arm 48 supports a roller 86 around which the ribbon from the ribbon roll (not shown) is threaded. A weight 88 is slidably secured within a hollow portion of the arm 48, whereby the tension applied to the ribbon by the tensioner arm 48 may be adjusted.

The tensioner arm 48 further includes a counterbalance extension 85 protruding radially outwardly from the shaft extension 81, approximately 180° degrees from the end thereof supporting the roller 86. The counterbalance extension 85 includes a hollow portion slidably supporting a counterbalance weight 87. The counterbalance weight 87 and counterbalance arm 85 provide means for adjusting the tension required to actuate the ribbon supply motor 66, as described infra.

The arm position sensing apparatus 64 includes an optical sensor 90, positioned within an aperture 92 in the front plate 50, and a bracket 94, which is secured to the tensioner arm 48 so as to face the optical sensor 90 when the arm is in the full downward position. The bracket 94 includes reflective and nonreflective surfaces 93,95, respectively, facing the front plate 50. The optical sensor 90 includes a light source, such as a light-emitting diode, and a light-sensitive element, such as a phototransistor, whereby the optical sensor 90 may act as an electronic switch.

When the nonreflective surface 95 of the bracket 94 is positioned opposite the optical sensor 90, light emitted by the light source portion of the sensor 90 is absorbed at the bracket 94 and the light-sensitive portion of the sensor 90 remains deactivated. When the tensioner arm 48 moves upward so that the reflective surface 93 of the bracket 94 is opposite the optical sensor 90, light emitted by the light source portion of the sensor 90 is reflected by the bracket 94, activating the light-sensitive portion of the sensor 90. Electric wires 96, providing a current source for the light source portion of the sensor and communicating an output signal from the light-sensitive portion of the sensor 90, connect the optical sensor 90 to apparatus control circuitry, described infra in the subsection entitled "Apparatus Control System."

RIBBON SPLICE DETECTION MEANS

FIG. 4 depicts the ribbon splice detection means 34 in front elevation. FIG. 5 shows the splice detection means 34 in cross section along a line 5—5 shown in FIG. 4. Referring now to FIGS. 4 and 5, the splice detection means 34 traps splices in the inked ribbon between a pair of pinch rollers 106,108 and, on entrapment thereof, triggers a microswitch 132, which sets off an alarm and stops the cartridge loading apparatus 30. The splice detector means 34 further includes a detector bar 112 and a biasing block 114. The pinch rollers 106,108, are rotatably supported on a free end of the detector bar 112. As shown in FIG. 5, for the first pinch roller 106, each pinch roller 106, 108 includes a roller body 116 rotatably supported on bearings 118, which are themselves supported on a central capstan 120. The capstan 120 is fixably secured within the detector bar 112. The first pinch roller 106 includes a radially-extending rim 122, which extends slightly beneath the second pinch roller 108, so as to keep the inked ribbon between the pair of rollers 106,108.

The detector bar 112 is pivotally attached to the front plate 50 at a pivot axis 124, on the end of the detector bar 112 which is opposite the end thereof supporting the pinch rollers 106,108. The biasing block 114 is affixed to the front plate 50 slightly to the right of and below the pivot axis 124, as viewed in the front elevation shown in FIG. 4. The biasing block 114 supports a spring 116 which biases the detector block 112 from the underside thereof in a generally upward direction. A ball actuator 126 in an actuator housing 128 is positioned in the front plate in intimate contact with a lower edge of the detector bar 112, immediately beneath the pinch rollers 106,108. The inner surface of the ball actuator 126 is in intimate contact with a shaft 130 of the microswitch 132.

When a splice within the inked ribbon is trapped between the pinch rollers 106,108, increasing tension caused by the drive motor attempting to draw additional ribbon into the cartridge pivots the free end of the detector bar 112 downward, depressing the spring 116 against the biasing block 114. Pivotal motion of the detector block 112 depresses the ball actuator 126 within the actuator housing 128, which in turn depresses the shaft 130 of the microswitch 132, triggering the microswitch 132. Electric wires 134 connect the microswitch 132 to apparatus control circuitry so as to trigger an alarm and stop the apparatus, as described further infra in the final subsection entitled "Apparatus Control System."

RIBBON LENGTH MEASURING MEANS

FIGS. 6, 7 and 8 show, respectively, a front elevation, a cross section, and a rear elevation of the ribbon length measuring means 36. The measuring means 36 monitors the length of ribbon loaded into a particular cartridge by providing to control circuitry for the apparatus an output signal indicative of ribbon movement through measuring means 36. In addition, the measuring means 36 includes means for stopping motion of the ribbon through the measuring means 36 when the proper length of ribbon has been loaded into the cartridge.

Referring now to FIGS. 6, 7, and 8, the measuring means 36 is shown to comprise a measuring cylinder 144, upstream and downstream rollers 146,148, a brake drum 150, a position sensing means 152, and a braking means 154. (The braking means 154 is not shown in FIG. 7 so as to facilitate a clearer view of the apparatus shown therein.) The measuring cylinder 144 comprises a cylinder of known diameter, for example, six inches, affixed to a central shaft 156 received axially through the base of the cylinder 144 and secured thereto. The circumferential face of the cylinder 144 is grooved to increase friction between the cylinder 144 and ribbon extending therearound. The central shaft 156 extends through a base block 158 and the front plate 50, being rotatably supported therein by means of a bearing 160. The rearward end of the central shaft 156 is received within and secured to the cylindrical brake drum 150.

The upstream and downstream rollers 146,148 are rotatably supported on bearings (not shown), which are received around capstans 162,164. The capstans 162,164 are secured within the base block 158. Inked ribbon extending from the splice detection means 34 extends counterclockwise around the upstream roller 146, clockwise around the perimeter of the measuring cylinder 144, and then counterclockwise around the downstream roller 148. The upstream and downstream rollers 146,148, coupled with the tension maintained in the inked ribbon by the tensioner arm and the grooved surface of the measuring cylinder 144, provide substantial surface contact and friction between the measuring cylinder 144 and the ribbon, thereby insuring that neither the measuring cylinder 144 nor the ribbon will move without corresponding motion by the other.

The position sensing means 152 includes an optical sensor 166 supported on a bracket 168 and connected to control circuitry by means of electric wires 170. The sensing means 152 further includes a nonreflective marker 172 extending approximately halfway around the outer edge of the otherwise reflective rearward surface of the brake drum 150, as depicted in FIG. 8. The marker 172 may comprise, for example, a black anodized region on a drum 150 comprised of aluminum. The optical sensor 166 operates in the same manner as the optical sensor 90 described supra for the ribbon supply means 32. The sensor 166 includes a light source, such as a light-emitting diode, and a light-sensitive element, such as a phototransistor. The sensor 166 thereby acts as an electronic switch, being activated when light is reflected to the light-sensitive element thereof and being deactivated when light is not reflected to the light-sensitive element.

The bracket 168 is attached to the rearward side of the front plate 50 and supports the optical sensor 166 in proximity to the rearward face of the brake drum 150, near the perimeter thereof. The electric wires 170 connect the optical sensor to control circuitry for the apparatus, as described infra in the subsection entitled "Apparatus Control System." The nonreflective marker 172 is positioned on the rearward face of the brake drum 150 so as to pass in proxmity to the optical sensor 166 when the brake drum 150 is rotated. The rearward face of the brake drum 150 comprises a generally reflective surface, which activates the optical sensor 166. The nonreflective marker 172 interrupts the normally activated sensor 166, providing an indication to the control circuitry that the measuring cylinder 144 has completed a single revolution.

The braking means 154 includes a braking strap 174, a strap block 176, a braking cylinder 178, and a cylinder block 180. The braking strap 174 is positioned around a substantial portion of the circumference of the brake drum 150, whereby, when the strap 174 is tensioned, it comes into contact with the circumference of the brake drum 150 and stops the angular motion thereof. The strap 174 is affixed at a first end thereof within the strap block 176, which is pivotally supported on the rearward face of the front plate 50 at a block axis 182. The opposite end of the strap 174 is attached within a cylinder strap block 184, which is secured to the end of a shaft (not shown) of the braking cylinder 178. The cylinder 178, which may comprise a double-acting pneumatic cylinder, Model No. 020.5-DXP, manufactured by Bimba, is pivotally supported by the cylinder block 180 with the lengthwise axis thereof generally parallel to the rearward face of the front plate 50.

When the cylinder 178 is energized by control circuitry for the apparatus 30, as described infra in the subsection entitled "Apparatus Control System," the shaft thereof is extended, applying tension to the braking strap 174 and thereby stopping the angular motion of the measuring cylinder 144. Thus, the braking means 154 provides an apparatus by which motion of the measuring cylinder 144 and motion of the inked ribbon through the apparatus 30 may be stopped immediately. It should be noted that any of several arrangements of the braking means 154 could be constructed, such as the use of conventional brake shoes, rather than a braking strap, to stop motion of the brake drum 150.

RIBBON CUTTING MEANS

FIG. 9 shows the ribbon cutting means 38 in front elevation and FIG. 10 shows the ribbon cutting means in cross section along a line 10—10 in FIG. 9. The cutting means 38 provides means for automatically severing the inked ribbon at such time as the proper length of ribbon has been loaded into the cartridge. Referring now to FIGS. 9 and 10, the ribbon cutting means 38 comprises generally a cutting base 194, a cutting arm 196, and a pneumatic cutting cylinder 198. The cutting base 194 is securely attached to the front plate 50, extending perpendicularly thereto through an opening 200 therein. The cutting arm 196 is pivotally attached near a lower, medial point thereof to the rearward end of the cutting base 194. The pneumatic cylinder 198 is affixed between the rearward end of the cutting arm 196 and the rearward face of the front plate 50 below the cutting base 194, whereby actuation of the cutting cylinder 198 causes the forward end of the cutting arm 196 to close on and engage the cutting base 194.

The cutting base 194 comprises a generally solid metal block having rectangular side and end faces and having a generally horizontal upper surface 202 onto which is received the inked ribbon. The cutting base 194 includes along the upper downstream (left, as viewed in FIG. 9) edge a lower cutting blade 204 extending approximately 0.010 inch beyond the downstream face of the cutting base 194, so as to facilitate cutting engagement with a portion of the cutting arm 196. The rearward end of the cutting base 194 includes a generally rectangular cutout, as shown at 206, in the upper downstream corner thereof.

The cutting arm 196 includes a blade support beam 208, an upper cutting blade 210, and an arm housing 212. The arm housing 212 includes at the forward end thereof a generally channel-shaped section 214 open at the downstream side of the housing 212. The rearward end of the arm housing 212 comprises an upstream side plate 216, pivotally attached to the cutting base 194 on a generally horizontal axis 218, and an upper plate 220. The blade support beam 208 includes a beam base 222, pivotally attached at the rearward end thereof to the cutting cylinder 198 and pivotally attached at the forward end thereof to the horizontal axis 218, and a beam arm 224 extending within the arm housing 212 to the channel-shaped section 214 thereof. The beam arm 224 is biased against a housing adjustment screw 226 extending through the upper portion of the channel-shaped section 214, by means of a pair of springs 228,229 positioned between the lower surface of the beam arm 224 and the lower horizontal extension of the channel-shaped section 214.

The upper cutting blade 210 is attached at an angle to the downstream side surface of the beam arm 224 in precise alignment with the lower cutting blade 204. A spring-loaded nut 230 threadedly engaged within the downstream end of the horizontal axis 218 biases the blade support beam 208 and arm housing 212 against the cutting base 194 within the cutout 206 thereof. The pneumatic cutting cylinder 198, which may comprise a double-acting pneumatic cylinder Model No. 020.5-DXP, manufactured by Bimba, includes upper and lower fluid lines 232, 234 for delivery of pressurized fluid to the pneumatic cutting cylinder 198. Such delivery of fluid is governed by the control circuitry of the apparatus, as described infra in the subsection entitled "Apparatus Control System."

On delivery of pressurized fluid to the lower fluid line 234, the cutting arm 196 is pivoted down toward the cutting base 194. The lower horizontal portion of the channel-shaped section 214 contacts the ribbon first and clamps it against the upper surface 202 of the cutting base 194, halting motion of the ribbon. Continued pressurization of the cutting cylinder 198 causes the blade support beam 208, with the upper cutting blade 210 attached thereto, to compress the springs 228,229 in pivotal motion toward the cutting base 194. Such pivotal motion of the blade support beam 208 brings the upper cutting blade 210 into contact with the lower cutting blade 204, severing the ribbon prior to full extension of the cutting cylinder 198. Thereafter, pressurized fluid is delivered to the upper fluid line 232 while fluid is exhausted from the lower fluid line 234, pivoting the cutting arm 196 away from the cutting base 194.

RIBBON WELDING MEANS

The ribbon welding means 40, depicted in front elevation in FIG. 11 and in side elevation in FIG. 12, comprises the means by which two loose ribbon ends are ultrasonically fused, whereby inked ribbon from the ribbon supply means 32 may be drawn into and through the ribbon cartridge. Referring now to FIGS. 11 and 12, the welding means 40 includes a converter booster horn stack 244, a stack transport apparatus 246, and a welding anvil apparatus 248. The converter booster horn stack 244 comprises an apparatus for converting an electrical signal delivered via an electric cable 250 to mechanical energy in the form of ultrasonic waves, for example, at 40,000 kilohertz. The welding stack 244 may be, for example, a converter booster horn stack Model No. 35042, manufactured by Branson Sonic Power Company of Danbury, Conn.

The stack transport apparatus 246 comprises the means by which the welder stack 244 is lowered into position immediately above the overlapped ribbon ends, which are clamped to the welding anvil apparatus 248. The stack transport apparatus 246 comprises a guide plate 252, a transport plate 254, a pair of stack clamps 256,258, a transport cylinder 260, and a cylinder stroke adjustment mechanism 262.

The front plate 50 includes at the welding means 40 upper and lower generally rectangular openings 264,265. The guide plate 252 is affixed to the rearward side of the front plate 50 immediately oppposite the lower rectangular opening 264. The transport plate 254 is slidably engaged to the front face of the guide plate 252, within the upper rectangular opening 265. Bearings (not shown) positioned between the two plates 252,254 insure that the transport apparatus 246 will not become jammed.

The upper and lower stack clamps 256,258 are spaced axially along the welder stack 244 and secured to the front face of the transport plate 254. The stack clamps 256,258 each comprise two separate clamping elements between which the welder stack 244 is gripped. The transport cylinder 260 comprises a double-acting pneumatic cylinder, such as a Model No. FO-17-1 pneumatic cylinder manufactured by Bimba. A downwardly extending shaft 266 of the transport cylinder 260 is connected to the upper end of the transport plate 254, whereby actuation of the transport cylinder 260, as described infra in the subsection entitled "Apparatus Control System," causes the transport plate 254 and attached apparatus to move downward with respect to the guide plate 252, so as to place the lower end of the welder stack 244 in proximity to the overlapped ribbon ends on the welding anvil apparatus 248.

The cylinder stroke adjustment mechanism 262 comprises a cylindrical bar 268 threadedly engaged within a vertical bore through the welding anvil apparatus 248. The upper end of the cylindrical bar 268 is positioned so as to abut against the lower end of the transport plate 354 and thereby to determine the downward limit of the stroke of the transport plate 254. Rotation of the cylindrical bar 268 within its threaded engagement with a portion of the welding anvil apparatus 248 may be used to adjust the downward stroke limit of the transport plate for different thicknesses of ribbon. The microswitch 271 includes electrical wires 275 communicating with apparatus control circuitry, whereby the welder stack 244 is energized in response to a signal from the microswitch 271.

Referring still to FIGS. 11 and 12, the upper end of the cylindrical bar 268 supports a switch bracket 269 extending rearwardly through a generally vertical slot in the front plate 50. The bracket 269 supports a microswitch 271 at the rearward end thereof. The microswitch 271 is actuated by a horizontal extension 273 on the lower end of the transport plate 254 when the transport plate reaches its downward limit of travel. The microswitch 271 includes electrical wires 275 communicating with apparatus control circuitry, whereby the welder stack 244 is energized in response to a signal from the microswitch 271.

Figure 16:
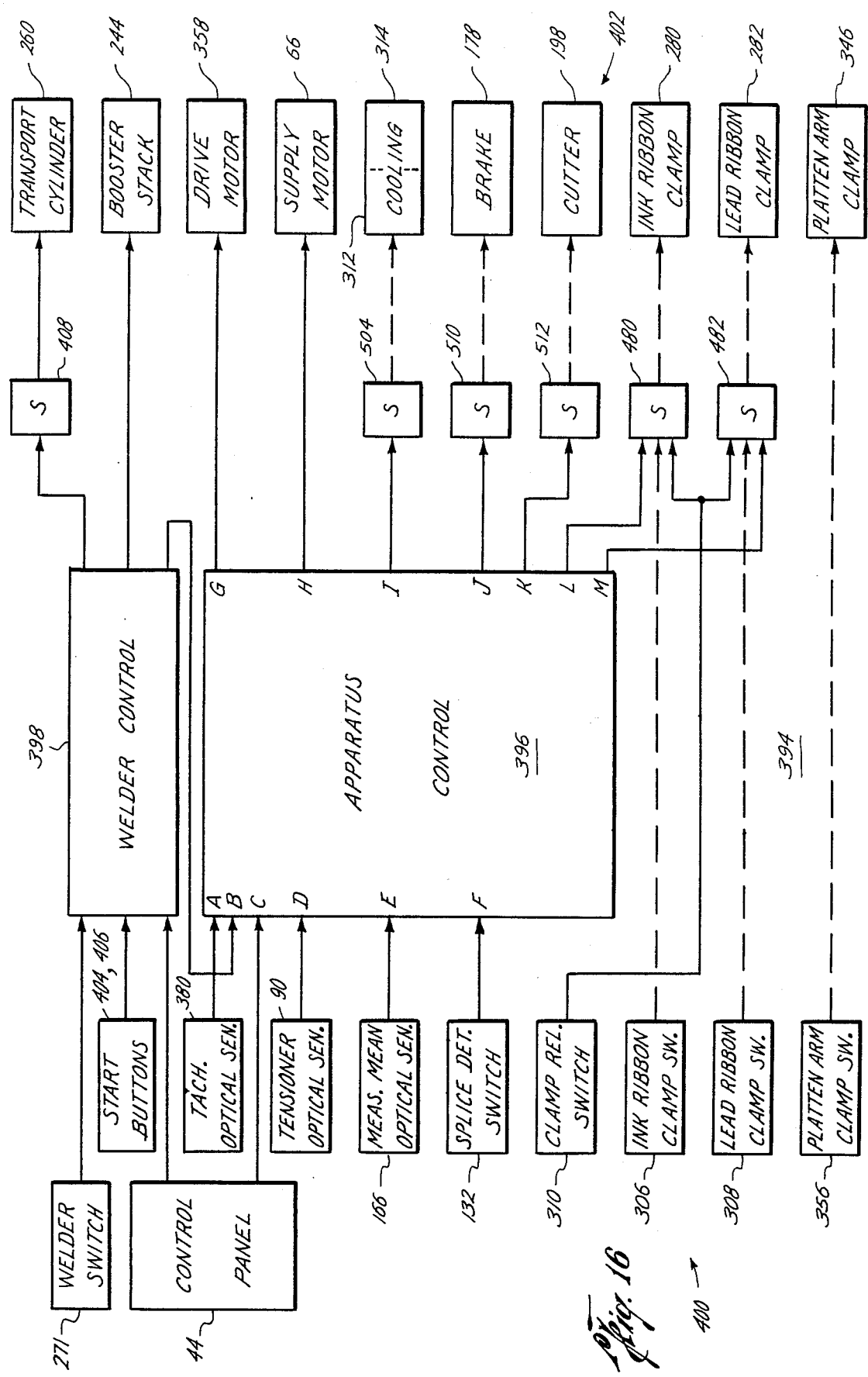
FIG. 16 is a block diagram of the control system for the apparatus shown in FIG. 1.

The welding anvil apparatus 248 comprises an anvil base 270, a pair of anvil clamps 272,274, a pair of guide mechanisms 276, 278, and a pair of clamp cylinders 280,282 (the left clamp cylinder 282 is shown in FIG. 16 only). The anvil base 270 is a support platform onto which the end of the inked ribbon from the ribbon supply means 32 and one end of the leader ribbon extending through the cartridge on assembly thereof are clamped in overlapping position. The anvil base 270 includes a forward portion 284 and a rearward portion 286 which extends through an generally rectangular opening 288 in the front plate 50.

The anvil base 270 includes along the centerline thereof a narrow channel 290 extending perpendicularly of the front plate 50. An anvil bar 292 is received within the channel 290 immediately below the welder stack 244. The first and second guide mechanisms 276,278 are positioned within the anvil base 270, perpendicular with respect to the front plate 50, on either side of the anvil bar 292. The guide mechanisms 276,278 each comprise a threaded shaft 294 rotatably disposed within a guide channel 296 and a guidepost 298 threadedly engaged by the shaft 294. Rotation of the threaded shaft 294 causes the guidepost 298 to move toward or away from the front plate 50, so as to adjust the anvil apparatus 248 for different widths of ribbon, for example, for ribbon widths one-eighth inch to one and one-half inches. A forwardly facing surface 300 forms the rearward guidepost for defining the path of the ribbon.

The anvil clamps 272,274 each are pivotally attached, as shown for the right clamp 272 in FIG. 12, at the rearward end thereof to the forward portion 284 of the anvil base 270 and to a cylinder shaft 302 extending from the clamp cylinder 280. The clamp cylinder 280 is preferably a double-acting pneumatic cylinder, such as a Model No. 020.5-DXP pneumatic cylinder manufactured by Bimba. Application of pressurized fluid through a first cylinder fluid line 304 of the clamp cylinder 280 causes extension of the cylinder shaft 302, which causes the anvil clamp 272 to pivot downward against the anvil base 270. Similarly, pressurized fluid delivered through a second fluid line 305 causes retraction of the cylinder shaft and opening of the right anvil clamp 272.

Referring briefly to FIG. 1, actuation of the clamp cylinders 280,282 is controlled by a pair of manual pneumatic switches 306,308. Actuation of each switch 306,308 generates a pneumatic signal to the control system and results in closure of the corresponding anvil clamp 272,274, respectively, as described infra in the subsection entitled "Apparatus Control System." A clamp release switch 310 provides a manually actuated safety valve for releasing the anvil clamps 272,274 in case an adjustment is necessary.

CARTRIDGE SUPPORT MEANS

Figure 13:
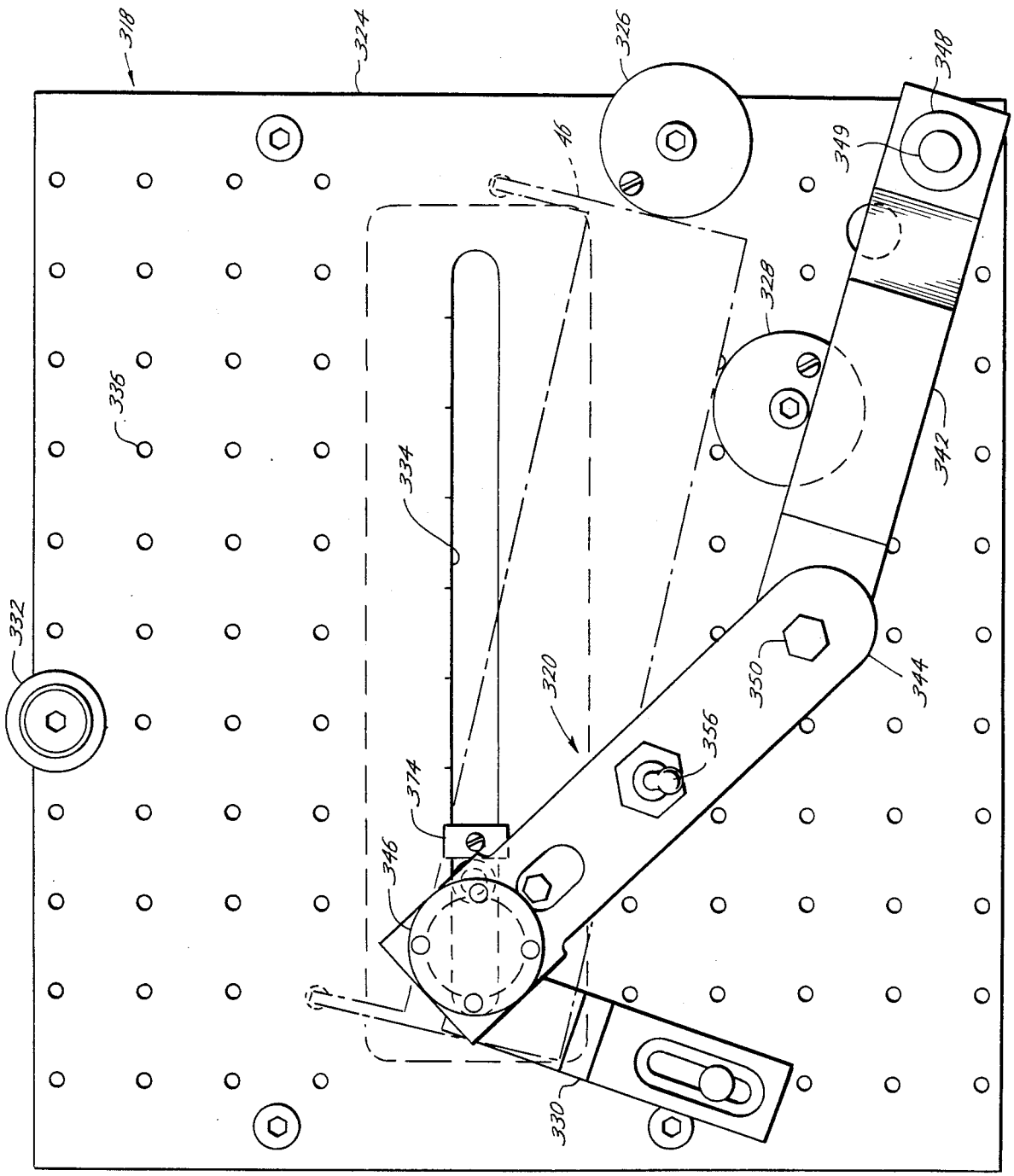
FIG. 13 shows a front elevation of a cartridge support means forming a part of the apparatus shown in FIG. 1.
Figure 14:
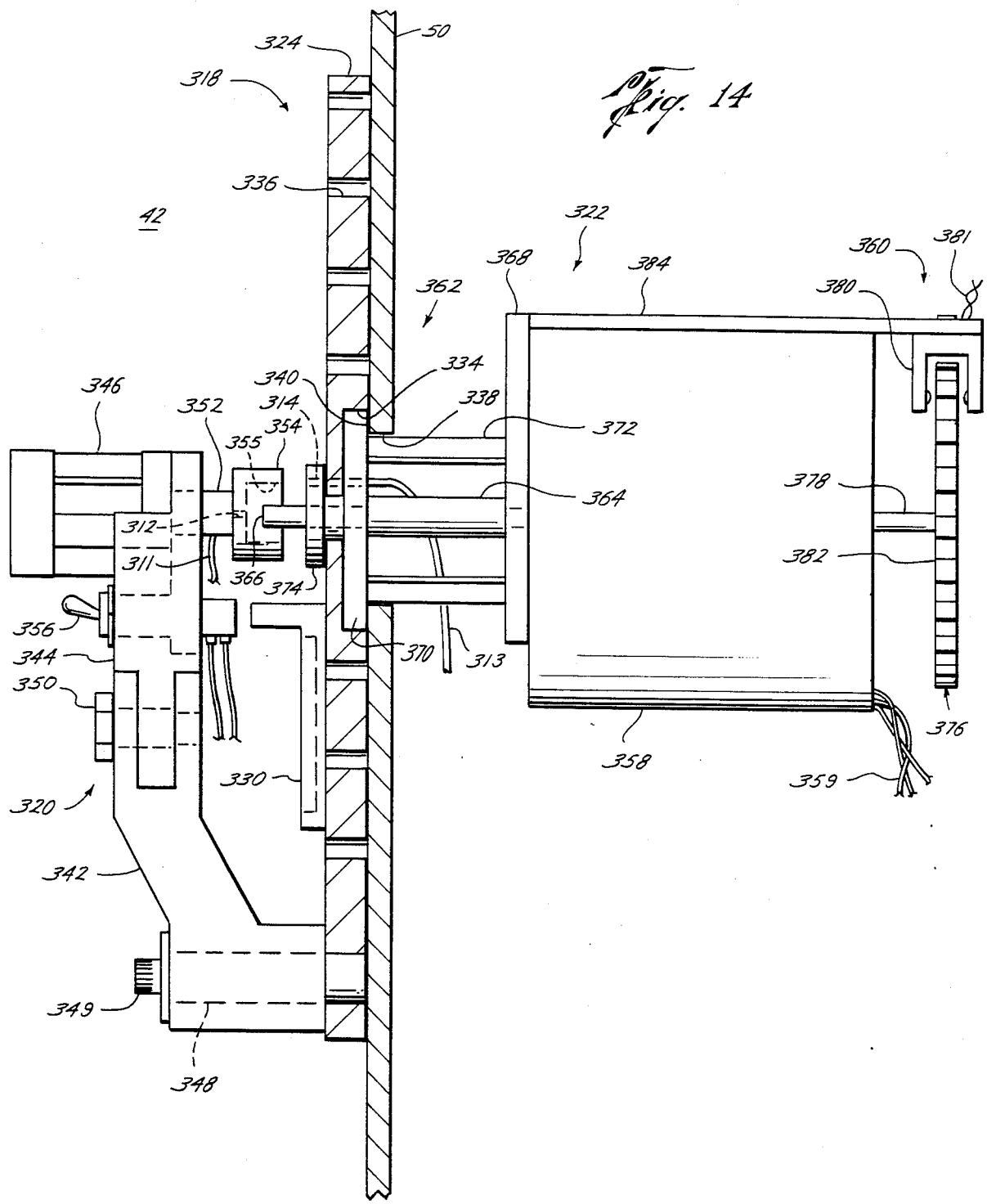
FIG. 14 shows a side elevation, partial cross section of the cartridge support means shown in FIG. 13.

FIGs. 13 and 14 disclose front and side elevations, respectively, of the cartridge support means 42, which includes apparatus for securing the cartridge 46 to the front plate 50 of the cartridge loading apparatus, as well as apparatus for pulling the inked printer ribbon into the cartridge 46. Referring now to FIGS. 13 and 14, the cartridge support means 42 thus comprises a universal platen 318, a platen arm 320, and a cartridge drive mechanism 322. The universal platen 318 comprises a platen plate 324, a pair of setup cams 326,328, a setup slide 330, and a setup roller 332. The platen plate 324, a generally rectangular plate secured to the front plate 50, includes an opening in the form of a generally horizontal slot 334 and a rectangular grid of threaded bores 336. The slot 334 in the platen plate 324 extends substantially across the width thereof, slightly above the centerline of the plate 324.

The front plate 50 includes a horizontal slot opening 338, corresponding in location to the opening 334 in the platen plate 324. The openings 334,338 in the platen plate 324 and the front plate 50 define therebetween a horizontal channel 340 for receiving a portion of the cartridge drive mechanism 322, described infra, whereby the horizontal position of the cartridge drive mechanism 322 may be adjusted to accommodate different configurations of cartridges.

The plurality of threaded bores 336 within the platen plate 324 will accommodate a plurality of differing arrangements of the two setup cams 326,328 and the setup slide 330, so that the universal platen 318 may easily be arranged for support of any of some sixty different configurations of ribbon cartridges. The threaded bores may, for example, be arranged in a rectangular grid of eleven rows and nine columns. Each threaded bore 336 may be assigned an alphanumeric character associated with its position in the grid. Applicant has created a chart which lists the proper position for each of the two setup cams 326, 328, the setup slide 330, and the setup roller 332 for each type of cartridge presently available. The setup cams 326, 328, and setup slide 330 support the particular cartridge on the universal platen 318, while the platen arm 320, as described infra, locks the cartridge against the platen plate 324. The setup roller 332 adjusts the incoming position of the ribbon so as to prevent damage thereto during the loading process.

Referring still to FIGS. 13 and 14, the platen arm 320 comprises a mechanism for locking the cartridge to the front surface of the platen plate 324. The platen arm comprises an arm base 342, an arm extension 344, and an arm cylinder 346. The arm base 342 is pivotally secured to the platen plate 324 at a pivot pin 348 in the lower right corner of the plate 324. The pivot pin 348 includes a thumbscrew 349 for rotatably adjusting the spacing between the platen plate 324 and the platen arm 320 so as to accommodate varying widths of cartridges. The arm extension 344 is pivotally secured to the opposite end of the arm base 342 at a pivot joint 350, whereby the position of the arm cylinder 346 may be adjusted by pivoting the platen arm 320 at its point of attachment 348 or at the pivot point 350. The arm cylinder 346, which may comprise, for example, a spring-loaded pneumatic cylinder Model No. FO-04-1, manufactured by Bimba, is disposed at the outermost end of the arm extension 344 with the shaft 352 thereof protruding toward the platen plate 324. The shaft 352, which includes on the outer end thereof a rubber fitting 354, is normally biased in the retracted position. A manual pneumatic switch 356 on the arm extension 344 enables an operator to actuate the arm cylinder 346, causing the rubber fitting 354 to lock the cartridge against the platen plate 324.

The rubber fitting 354 on the cylinder shaft 352 includes a generally hollow interior 355 which is closed by the side of cartridge 46 when the switch 356 is actuated. Typically, the fitting 354 is clamped over an opening in the side of the cartridge, such as the point where a cartridge capstan shaft is journaled in the side of the cartridge. Pressurized cooling fluid, such as filtered air, delivered through an arm cooling supply line 311 and a nozzle 312 to the interior 355 of the fitting 354, is forced into the corresponding cartridge opening so as to dissipate heat generated by friction between the cartridge parts. Such an introduction of cooling fluid permits the cartridge drive gear to be rotated at higher speeds without risk of damage to the cartridge.

The cartridge drive mechanism 322 comprises a drive motor 358, a drive support bracket 362, and a tachometer 360. The drive motor 358 may comprise, for example, a Model No. DH2250-AU-1, manufactured by Clifton Precision Division of Litton Industries, having a drive shaft 364 extending through the slot openings 338,334 in the front plate 50 and the platen plate 324, respectively, to engage the drive gear (not shown) within the cartridge being loaded. Any of a variety of drive couplings 366, such as a Phillips head, a flat head, a cross, or some other type, may be used to connect the drive shaft 364 to the drive gear within the ribbon cartridge. The drive motor 358 is connected to apparatus control circuitry via electric wires 359.

The drive support bracket 362 comprises a motor bracket 368 secured to the front face of the drive motor 358, a channel bracket 370 which is slidably received within the channel 340 between the front plate 50 and the platen plate 324, and a plurality of bracer bars 372 securing the motor bracket 368 to the channel bracket 370. A locking bar 374 extends from the channel bracket 370 through the slot 334 in the platen plate 324 into engagement with the front face thereof. When the locking bar 374 is loosely attached to the channel bracket 370, the drive support bracket 362 may be slid along within the channel 340 formed between the front plate 50 and platen plate 324, so as to accommodate the wide variety of cartridge configurations. Once the drive motor 358 has been properly positioned for use with a particular cartridge, the locking bar 374 may be tightened against the channel bracket 370 by means of a bolt to prevent subsequent movement within the channel 340.

The drive support bracket 362 further includes a drive cooling mechanism comprising a drive cooling air supply line 313 delivering pressurized cooling fluid, such as filtered air, to a drive cooling nozzle 314. The cooling nozzle 314 directs a flow of cooling fluid into the cartridge at the point where the drive coupling 366 engages the drive gear in the cartridge, so as to diminish heat generated in the cartridge due to friction. The drive cooling mechanism thereby enables the drive motor 358 to operate at higher speeds, for example, in the range of 1500 to 3000 revolutions per minute, without risk of damage to the cartridge.

The tachometer 360 comprises a tachometer gear 376 disposed on a rearward extension 378 of the drive shaft 364 and an optical sensor 380 for detecting rotation of the tachometer gear 376. The tachometer gear 376 may comprise a circular metal gear having a plurality of generally square teeth 382 machined about the circumference thereof. The optical sensor 380 acts as an electronic switch to detect and measure rotation of the tachometer gear 376.

The sensor 380 includes a light source, such as a light-emitting diode, projecting a beam of light toward a light-sensitive element, such as a phototransistor, within an opposing face of the sensor 380. The optical sensor 380 is supported on a sensor bracket 384 which projects from the drive motor 358, so that the path of travel of the light beam between the light source and light-sensitive element within the optical sensor 380 may project between the teeth 382 of the tachometer gear 376. As the gear 376 rotates with rotation of the drive shaft 364, the said light path is alternately opened and blocked by the passage of the teeth 382 therethrough, providing a series of electronic pulses, via sensor wires 381 to the apparatus control circuitry, as described infra in the subsection entitled "Apparatus Control System."

OPERATION OF THE CARTRIDGE LOADING APPARATUS

Figure 15:
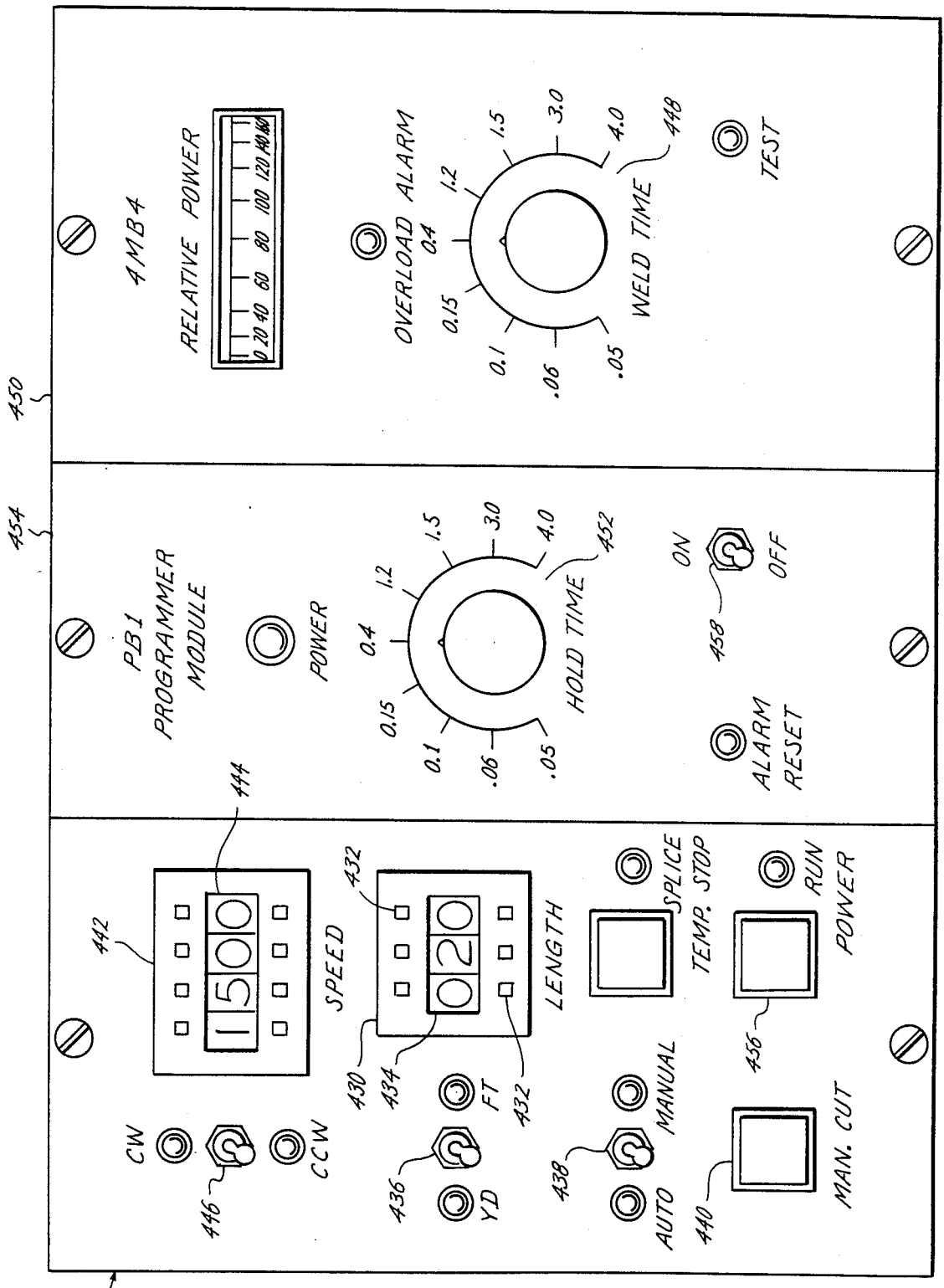
FIG. 15 shows a front elevation of a control panel forming a part of the apparatus shown in FIG. 1.

FIG. 15 depicts a front elevation of the control panel 44 (FIG. 1) for the cartridge loading apparatus. Referring now to FIG. 15, operation of the cartridge loading apparatus first requires performance of a setup procedure. The setup procedure begins by making reference to a chart to determine the proper positions for the setup cams 326,328, the setup slide 330, the setup roller 332, and the platen arm 320 on the platen plate 324 (FIG. 13). The setup chart specifies the proper position for each of the foregoing elements for every known configuration of cartridge.

It is necessary to select the length of ribbon to be loaded into the particular cartridge by referring to the length selector switch 430 on the control panel 44 and by depressing the indexing buttons 432 thereon until the switch readout 434 indicates the number of feet or yards which are to be loaded into the cartridge. The length toggle switch 436, adjacent to the length selector switch 430, is switched to the yard ("YD") position or the feet ("FT") position, accordingly.

A run selector switch 438, immediately below the length toggle switch 436, should be placed in the "AUTO" position for normal operation of the cartridge loading apparatus. If the toggle switch 438 is placed in the "MANUAL" position, all operations would proceed as described infra, except that the ribbon cutting means 38 (FIG. 1) would not sever the ribbon at the end of the loading process. Instead, the ribbon could be severed while in the "MANUAL" position by depressing the manual cut switch 440 immediately below the run selector switch 438.

The loading speed of the cartridge loading apparatus is determined at a speed selector switch 442 in the same manner that the length to be loaded into a cartridge is selected at the length selector switch 430. Unlike the length selector switch 430, however, a switch readout 444 on the speed selector switch 442 always indicates the speed in revolutions per minute of the drive motor. A motor direction toggle switch 446 in the upper left corner of the control panel 44 is placed in the clockwise ("CW") position or the counterclockwise ("CCW") position, in accordance with the direction that the drive motor 358 (FIG. 14) must rotate in order to pull the ribbon into the particular cartridge being loaded.

The two rightmost sections of the control panel 44 are associated with the control system for the welder. The duration of the ultrasonic signal used to fuse the overlapping ribbon ends is determined by a weld time selector control 448 on a welder power supply module 450. The period of time during which the converter horn booster stack 244 (FIGS. 11 and 12) remains down against the overlapped ribbon ends after termination of the ultrasonic weld signal, so as to act as a heat sink, is determined by a hold time selector control 452 on a welder programmer module 454. Finally, with regard to the control panel 44, power to the apparatus should be turned on at the power switch 456, located adjacent to the manual cut switch 440, and at the welder power toggle switch 458 on the welder programmer module 454.

Referring now to FIGS. 1 and 2, the operator takes a roll of pre-inked ribbon 460, places it over the spool 60 against the disk 62, and tightens the nut 76 to lock the pre-inked ribbon roll 460 onto the spool 60. Next, the operator takes the free end of the pre-inked ribbon away from the ribbon roll 460 in the counterclockwise direction, brings it counterclockwise around a first guide roller 462, clockwise around the roller 86 on the tensioner arm 48, and up to the ribbon splice detection means 34. The ribbon end is threaded through the pinch rollers 106,108 of the splice detection means 34 from the upper to the lower sides thereof and down to the ribbon length measuring means 36. At the measuring means 36, the ribbon end is brought counterclockwise around the inside of the upstream roller 146, clockwise around the perimeter of the measuring cylinder 144, counterclockwise around the downstream roller 148, and down to a second guide roller 464. The ribbon end is threaded clockwise around the second guide roller 464 and across the top of the cutting base 194 to the welding anvil apparatus 248. Support pedestal 465 provides a place for the operator's right hand to rest while the end of the ribbon is extended onto the welding anvil apparatus.

Referring now to FIGS. 11 and 12, the free end of the pre-inked ribbon is placed across the upper surface of the anvil base 270 so as to pass beneath the converter booster horn stack 244. The guideposts 298 are adjusted to the width of the ribbon, which may be, for example, one-eigth inch to one and one-half inches, by rotating the threaded shaft 294. Alternatively, the anvil apparatus 248 could be adapted to accommodate ribbon of any known width. When the ribbon end is aligned beneath the welder stack 244, the first manual switch 308 (FIG. 1) is actuated, causing the right ink ribbon anvil clamp 272 to close on the ribbon and thereby lock it against the upper surface of the anvil base 270.

Alternatively, the present cartridge loading apparatus may be used to load ribbon into cartridges which have externally exposed drive gears. In such cartridges, the pre-inked ribbon may be inserted directly into the cartridge without use of a leader ribbon. Thus, pre-inked ribbon is threaded past the welding means 40 in such cases, directly to the cartridge. A similar procedure may be adopted by some manufacturers who prefer to assemble the cartridges on the loading apparatus with the pre-inked ribbon extending therethrough.

Referring again to FIG. 1, the cartridge 46 is positioned against the platen plate 324. The cartridge 46 may comprise a new cartridge, preassembled with a short leader ribbon extending therethrough. Alternatively, the cartridge 46 may comprise an old cartridge with all but a short length of the old ribbon removed and discarded therefrom, such short length of old ribbon comprising the leader ribbon to be used to effect restuffing of the old cartridge. The thumbscrew 349 (FIG. 13) on the platen arm 320 is manipulated to adjust the distance between the arm 320 and the plate 324 and the manual switch 356 on the platen arm 324 is actuated to lock the cartridge 46 into place. The left end of the leader ribbon is threaded counterclockwise around the setup roller 332, clockwise around a third guide roller 466, and onto the welding anvil apparatus 248. The end of the leader ribbon is placed beneath the converter booster horn stack 244, overlapping the free end of the pre-inked ribbon, and clamped against the anvil apparatus 248 by actuating the second manual switch 306.

Finally, the operator adjusts a primary system pressure regulator 472 to obtain a system pressure of approximately sixty pounds, as indicated on a corresponding primary system pressure indicator 474. Similarly, a cooling system pressure regulator 468 is adjusted until a cooling system pressure indicator 470 indicates approximately 100 pounds per square inch. Left and right cooling selection switches 476,478 are each positioned in the "ON" or "OFF" position according to whether cooling fluid will be delivered to the arm and drive cooling supply lines 311,313 (FIG. 14).

When dual start buttons 404,406 are depressed simultaneously, the cartridge loading cycle begins. The converter booster horn stack 244 immediately moves downward against the overlapping ribbon ends, the ribbon ends are quickly fused together, the welder stack 244 moves upward, and the drive motor 358 (FIG. 14) is activated to begin pulling ribbon into the cartridge 46. The drive motor 358 (FIG. 14) is ramped up to the operating speed selected on the control panel 44 during the setup procedure.

As ribbon is drawn into the cartridge 46, the tensioner arm 48 is pivoted upward, generating a signal to the apparatus control circuitry, as described infra, indicative of the need for additional ribbon from the ribbon roll 460. Accordingly, the apparatus control circuitry actuates the ribbon supply motor 66 (FIG. 2), feeding additional ribbon toward the cartridge 46 and causing the tensioner arm to move downward, which in turn causes the ribbon supply motor 66 (FIG. 2) to be deactivated. In this manner, the ribbon supply means 32 provides a continuous supply of pre-inked ribbon to the cartridge 46 without need for the drive motor 358 (FIG. 14) to incur the additional load associated with pulling pre-inked ribbon from the ribbon roll 460 as well as through the various portions of the apparatus 30.

Cartridge loading thus proceeds at the generally rapid loading speed preselected at the control panel 44. When the control system determines that the loading process is nearly complete, the speed of the drive motor 358 (FIG. 14) is gradually ramped down and then stopped, at which time the braking means 154 (FIG. 8) and the ribbon cutting means 38 are actuated to stop the motion of and sever the ribbon.

Ribbon cartridges loaded with pre-inked ribbon are then removed from the cartridge loading apparatus 30. The short length of leader ribbon initially assembled through the cartridge 46 is pulled from the cartridge and cut off from the leading end of the inked ribbon. The two ends of the inked ribbon extending from either end of the cartridge 46 are then joined by a suitable welding apparatus and the loose ribbon remaining outside the cartridge is wound into the cartridge to produce a completed printer ribbon cartridge.

APPARATUS CONTROL SYSTEM

Referring now to FIG. 16, there is shown therein a block diagram depicting the control system 394 for the cartridge loading apparatus. The control system 394 comprises an apparatus control 396, a welder control 398, a plurality of control inputs 400, and a plurality of control outputs 402. The welder control 398 comprises the apparatus for programming and operating the ultrasonic welding mechanism used with the cartridge loading apparatus. A suitable welder control, Model No. PBI Programmer Module and Model No. 4MB4 Power Supply, is manufactured by Branson Sonic Power Company, Eagle Road, Danbury, Conn. 06810. As may be seen from FIG. 15, the welder control 398 functions substantially independent of the apparatus control 396. Accordingly, further description herein will not be devoted to the welder control 398, except as to control inputs 400 and control outputs 402 connected thereto. Further detail of the welder control 398 may be had by reference to product and specification data available from the manufacturer of the welder control.

The control inputs 400 comprise switches and sensors located throughout the cartridge loading apparatus. To the extent such switches and sensors have been described and shown, supra, common reference characters are used herein and reference is made to those figures wherein such switches or sensors are depicted. The start buttons 404,406 (FIG. 1) provide a signal to the welder control 398 indicating that the loading process should begin.

Figure 18:
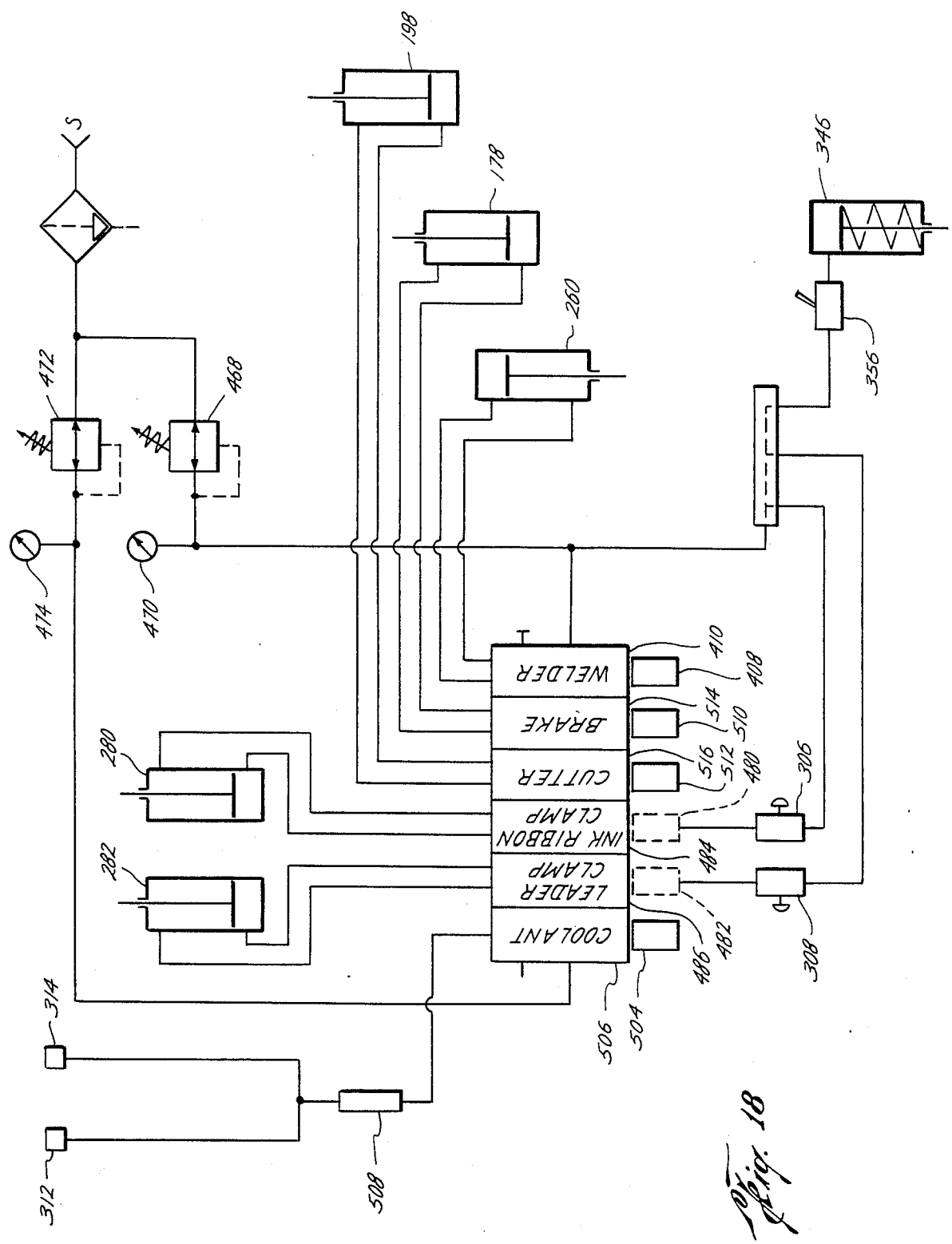
FIG. 18 is a block diagram of the pneumatic system for the apparatus shown in FIG. 1.

Referring now to FIGS. 16 and 18, the welder control 398 thereafter actuates a welder solenoid 408, which switches a pneumatic welder valve 410. The pneumatic welder valve 410 delivers fluid pressure to the transport cylinder 260 either to extend or to retract the shaft thereof. Actuation of the welder solenoid 408 causes extension of the shaft of the transport cylinder 260, lowering the converter booster horn stack 244 (FIGS. 11 and 12) against the overlapped ribbon ends. On reaching the lower limit of travel, the booster stack trips the welder microswitch 271, which signals the welder control 398 to begin the welding process. Thereafter, the welder control 398 sends a signal to the converter booster horn stack 244 (FIGS. 11 and 12), which generates an ultrasonic signal to fuse the overlapped ribbon ends.

After a short hold cycle, the welder control deactivates the welder solenoid 408, causing the transport cylinder 260 to retract its shaft so as to raise the converter horn booster stack 244 (FIGS. 11 and 12). On completion of the welding operation, the welder control 398 sends a signal to the "B" input port on the apparatus control 396.

Figure 17:
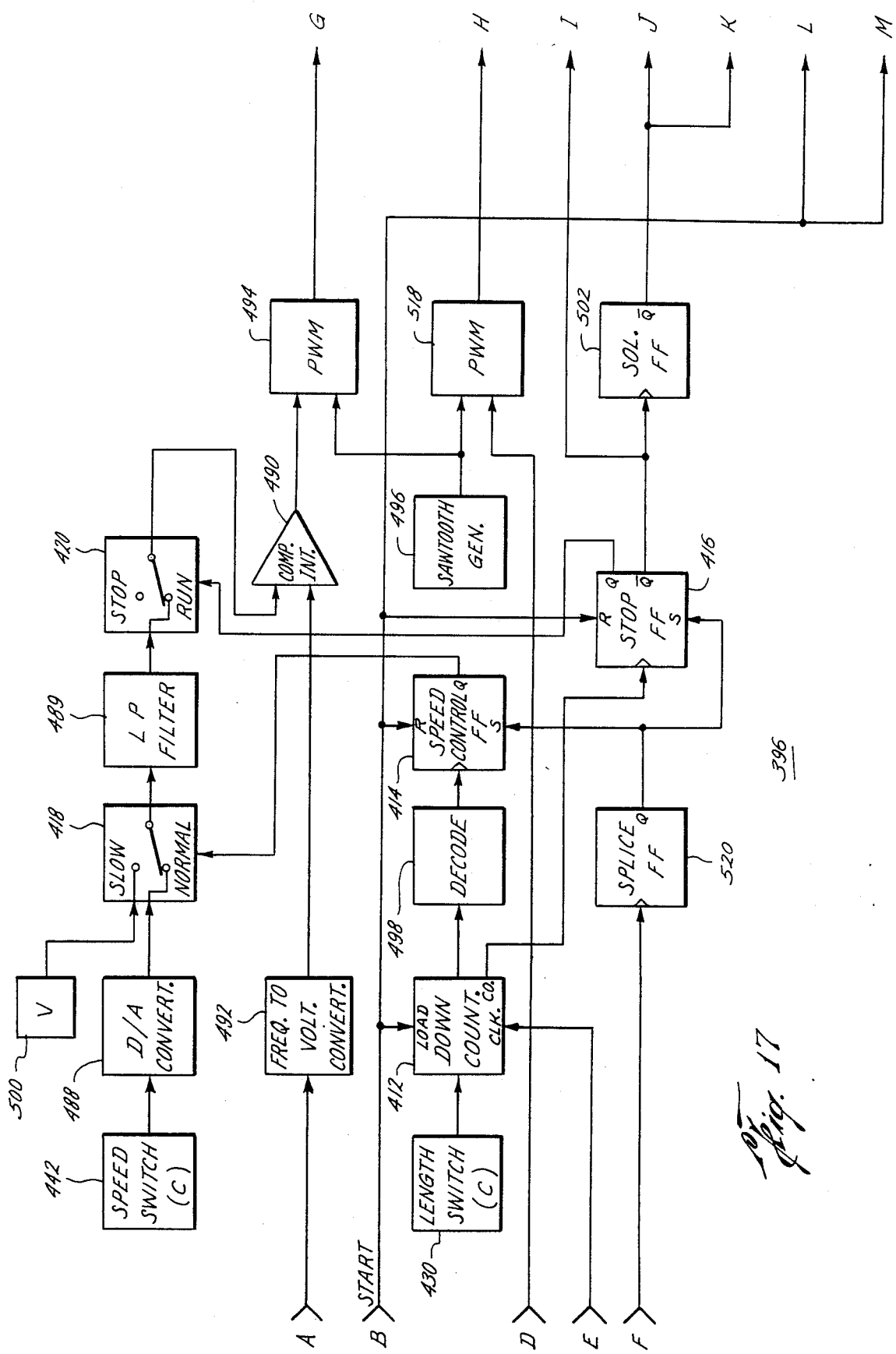
FIG. 17 is a block diagram of the electronics comprising the Apparatus Control shown in FIG. 16.

Referring now to FIG. 17, the START signal received at input port "B" from the welder control 398 executes several functions within the apparatus control 396. The START signal causes a down counter 412 to be loaded in parallel with the present reading of the length selector switch 430, which reading was preset during the setup procedure. The START signal also resets a speed control flip-flop 414 and a stop flip-flop 416. The speed control flip-flop 414 in turn resets a speed control switch 418 to the "NORMAL" position and the stop flip-flop 416 resets a stop switch 420 to the "RUN" position. Finally, the START signal is communicated to the "L" and "M" output ports. Referring briefly to FIGS. 16 and 18, signals from the "L" and "M" output ports activate a pair of solenoids 480,482, which switch pneumatic clamp valves 484, 486, so as to retract the shafts of the inked ribbon clamp cylinder 280 and the leading ribbon clamp cylinder 282, raising the clamps and releasing the fused ribbon ends.

Referring now again to FIG. 17, the speed which was preset on the speed selector switch 442 is converted to a voltage at a digital-to-analog (D/A) converter 488, which comprises, for example, a resistor network and an operational amplifier. The voltage generated by the D/A converter 488 passes through the speed control switch 418, a low-pass filter 489, and the stop switch 420 to a drive motor comparator/integrator 490. The low-pass filter 489 inhibits rapid changes in the magnitude of the voltage signal from the D/A converter 488, thereby effecting a "ramp up" function when the input signal to the filter 489 changes from zero volts to the voltage generated by the D/A converter 488. At the drive motor comparator/integrator 490, voltage derived from the D/A converter 488, which is indicative of the desired loading speed, is compared to a voltage derived from the tachometer 360 (FIG. 14) on the drive motor 358 (FIG. 14).

Referring briefly to FIG. 16, the optical sensor 380 on the tachometer 360 (FIG. 14) provides a signal to the "A" input port on the apparatus control 396. Referring now to FIG. 17, the signal from the optical sensor received through input port "A", being in the form of as series of pulses whose frequency is directly related to the angular velocity of the drive motor, is communicated to a frequency-to-voltage converter 492. The output signal from the frequency-to-voltage converter is a voltage proportional to the actual speed of the motor. Thus, the comparator/integrator 490 generates an output signal, the magnitude of which is directly related to the integral of the difference between the actual and the desired speeds of the drive motor.

The output signal from the drive motor comparator 490 is passed to a first pulse width modulation circuit 494. The first pulse width modulation circuit 494 also receives as an input signal thereto a sawtooth wave from a sawtooth generator 496. The output signal from the first pulse width modulation circuit 494, consisting of a series of pulses, is communicated to the "G" output port of the apparatus control 396. As may be seen in FIG. 16, output port "G" is connected to the drive motor 358. Thus, once the apparatus control 396 is enabled by the START signal, the drive motor is activated, ramped up to the preset speed, and maintained at the preset speed by the aforedescribed control circuit.

As was noted, supra, the START signal caused the down counter 412 to be loaded in parallel with the setting from the length switch 430. Referring briefly to FIG. 16, as ribbon motion begins, the optical sensor 166 on the brake drum 150 (FIG. 7) of the ribbon length measuring means 36 (FIG. 1) begins to generate an output signal indicative thereof. Such output signal is communicated to input port "E" of the apparatus control 396. Referring again to FIG. 17, the output signal from the ribbon length measuring means 36 (FIG. 1), being in the form of a series of pulses, is connected to a clock input on the down counter 412. Thus, as ribbon is loaded into the cartridge, the down counter 412 is gradually clocked down from the initial setting determined by the position of the length selector switch 430.

The state of the down counter 412 is constantly monitored by a decode circuit 498 until it reaches a predetermined state near zero, whereupon the decode circuit 498 issues a signal to the clock input of the speed control flip-flop 414. When clocked, the speed control flip-flop 414 changes state at its output ("Q") port, which switches the speed control switch 418 to the "SLOW" position. When the speed control switch 418 is switched to the "SLOW" position, a slow speed voltage from a voltage source 500 is connected through the low-pass filter 489 to the comparator/integrator 490. The output signal from the low-pass filter 489 decays over a predetermined period of time from the voltage level of the D/A converter 488 to the voltage level of the voltage source 500, thereby effecting a "ramp down" function. When the down counter 412 reaches the zero state, a signal from the carry output ("CO") of the down counter 412 is communicated to a clock input on the stop flip-flop 416, thereby causing the stop flip-flop to change state at its output ("Q") port, which resets the stop latch 420 to the "STOP" position. Thus, the drive motor is gradually slowed and then stopped.

An additional function controlled by the stop flip-flop 416 involves control of the flow of cooling fluid and operation of the brake means 154 (FIG. 8) and ribbon cutting means 38 (FIG. 1). When the stop flip-flop 416 is initially reset by the "START" signal, the inverted output ("$\overline{Q}$") port communicates a signal to output port "I". Referring briefly to FIGS. 16 and 18, the output signal derived from the output port "I" is communicated to a cooling solenoid 504, which switches a pneumatic cooling valve 506, causing the cooling nozzles 312,314 to be connected to a source of pressurized fluid provided through the cooling system pressure regulator 472. The pressurized fluid from the coolant valve 506 is forced through a vortex tube 508 before reaching the cooling nozzles 312,314 so as to induce a drop in temperature within the cooling fluid.

Referring again to FIG. 17, when the stop flip-flop 416 changes state in response to a signal from the carry output ("CO"), the inverter ("$\overline{Q}$") output from the stop flip-flop 416 deactivates the cooling solenoid 504 (FIGS. 16, 18) and clocks a solenoid flip-flop 502 which produces an output signal of predetermined duration at the "J" and "K" output ports of the apparatus control 396.

Referring briefly to FIGS. 16 and 18, the output signal communicated to the "J" and "K" output ports actuates momentarily brake and cutter solenoids 510,512, respectively. The brake and cutter solenoids thereby momentarily switch brake and cutter pneumatic valves 514,516, which, in turn, momentarily extend the shafts of the braking cylinder 178 of the brake means 154 (FIG. 8) and the cutting cylinder 198 of the cutting means 38 (FIG. 1). Accordingly, when the drive motor is brought to a stop, the brake means 154 (FIG. 8) is actuated momentarily to halt forward motion of the ribbon and simultaneously the cutting means is actuated momentarily to sever the ribbon when a precisely measured length of ribbon has been loaded into the cartridge.

Referring now to FIG. 16, the tensioner arm 48 (FIG. 1) periodically activates and deactivates an optical sensor 90 of the ribbon supply means 32 (FIG. 1), generating an output signal which is communicated to input port "D" on the apparatus control 396. Referring now to FIG. 17, the signal at input port "D" derived from the optical sensor of the ribbon supply means 32 (FIG. 1) is communicated directly to a second pulse width modulation circuit 518, which, in turn, is connected to output port "A". The second pulse width modulation circuit 518 is essentially identical to the first pulse width modulation circuit 494, except that the voltage input received by the second modulation circuit 518 is essentially a series of pulses. Referring briefly to FIG. 16, output port "H" is connected to the ribbon supply motor 66 of the supply means 32 (FIG. 1). Thus, as described supra, movement of the tensioner arm controls activation and deactivation of the ribbon supply motor 66.

Referring still to FIG. 16, the splice detector microswitch 132 of the splice detection means 34 (FIG. 1), is connected to input port "F" of the apparatus control 396. Referring now to FIG. 17, input port "F" is connected to the clock input on a splice flip-flop 520. When the microswitch of the splice detection means 34 (FIG. 1) is actuated, the splice flip-flop 520 momentarily changes state, setting the ramp and stop flip-flops 414,416, stopping the drive motor and the ribbon, and causing the execution of all the attendant operations described supra.

Referring now to FIGS. 16 and 18, the ink ribbon clamp valve 484 and the leader ribbon clamp valve 486 are switched initially to extend the shafts of the ink ribbon clamp cylinder 280 and the leader ribbon clamp cylinder 282 by depressing manual clamp switches 306,308 during the setup procedure. The clamp switches 306,308 communicate fluid pressure from the primary system pressure regulator 468 to, and thereby switch, the clamp valves 484,486. In addition to signals from the "L" and "M" output ports, the clamp solenoids 480,482 may be activated and the clamp valves 484,486 thereby switched, so as to retract the shafts of the clamp cylinders 280,282, by a clamp release switch 310. The clamp release switch 310 may be used when it is necessary to readjust the positions of the overlapped ribbon ends after the ribbon ends already have been clamped to the welding anvil apparatus 248 (FIG. 1).

The pneumatic system also includes a manual pneumatic switch 356 on the platen arm 320 (FIGS. 13 and 14) for actuating the arm cylinder 346, so as to clamp the cartridge 46 (FIG. 1) against the platen plate 324 (FIG. 13).

CONCLUSION

The present cartridge loading apparatus improves over prior art devices dedicated to the same function by enhancing the efficiency and reliability of the cartridge loading process. The known prior art does not includes a means for rapidly adjoining the ends of the inked ribbon and the leader ribbon, as does the present invention. The known prior art does not disclose the use of cooling means to facilitate rapid loading speeds; nor does it depict the use of a brake or clamp applied to the ribbon. The known prior art does not reveal a cartridge support means which is simple and yet adaptable to any cartridge configuration without the purchase of additional fixtures. The known prior art devices cannot be adapted quickly for different ribbon widths, as can the present invention. Applicant has combined the many features described in the foregoing text to produce a machine which accomplishes the cartridge loading task quickly, with a minimum of operator interaction.

The cartridge loading apparatus also includes two motors—a drive motor and a supply motor—with means for energizing the latter in response to ribbon motion induced by the former. Thus, the apparatus is capable of rapid acceleration without substantial drag on the ribbon and ribbon cartridge. The apparatus includes as well other useful features, such as a splice detector, a ribbon length measuring means, and a cutter mechanism, for performing functions necessary to a well designed cartridge loading apparatus. One skilled in the art of designing printer ribbon-related manufacturing equipment will appreciate that the foregoing list of attributes and advantages is not exhaustive of the features of the present invention. It will also be appreciated that modifications to the aforedescribed preferred embodiment of the invention can be made without departing in substance from the spirit of the invention.

What is claimed is:

1. Apparatus for stuffing ribbon into a continuous loop printer ribbon cartridge, comprising:
   a plate means;
   means connected to said plate means for supplying ribbon to the cartridge;
   a platen means attached to said plate means for receiving the cartridge, said platen means including:
      a platen plate,
      at least first and second means pivotably secured to said platen plate for supporting the cartridge,
      means for retaining against said platen plate the cartridge borne by said support means, and
      means for changing the point of attachment of said support means on said platen plate to accommodate different configurations of cartridges to be stuffed with ribbon; and
   drive means connected to said plate means for drawing ribbon into the cartridge.

2. Apparatus according to claim 1, further comprising means for adjusting the position of said drive means to accommodate a plurality of different cartridge configurations.

3. Apparatus according to claim 1, wherein said retaining means comprises a platen arm pivotably secured to said platen plate and arranged to rotate in a plane spaced from said platen plate and oriented generally parallel thereto, said platen arm including means for engaging the cartridge.

4. Apparatus according to claim 3, wherein said cartridge engaging means comprises a flexible fitting affixed to said platen arm and extensible to lock the cartridge against said platen plate but permit rocking motion thereof in response to operation of said drive means.

5. Apparatus according to claim 1, wherein said changing means comprises:
   a plurality of threaded boreholes arranged in a generally rectangular matrix on said platen plate; and a plurality of bolt means, each extending through one of said support means and threadedly engaging one of said plurality of threaded boreholes.

6. Apparatus according to claim 5, wherein said support means comprise cylindrical camming means including said bolt means extending therethrough offset from the axial center thereof.

7. Apparatus according to claim 5, wherein one said support means comprises a sliding means including a slot therein for slidably receiving a bolt means therethrough.

8. Apparatus according to claim 5, wherein said support means comprises a roller.

* * * * *